(12) United States Patent
Ikeda et al.

(10) Patent No.: US 6,204,881 B1
(45) Date of Patent: Mar. 20, 2001

(54) IMAGE DATA PROCESSING APPARATUS WHICH CAN COMBINE A PLURALITY OF IMAGES AT DIFFERENT EXPOSURES INTO AN IMAGE WITH A WIDER DYNAMIC RANGE

(75) Inventors: Eiichiro Ikeda, Tokyo; Kenichi Kondo, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/009,282

(22) Filed: Jan. 20, 1998

Related U.S. Application Data

(62) Division of application No. 08/328,539, filed on Oct. 26, 1994, now Pat. No. 5,801,773.

(30) Foreign Application Priority Data

Oct. 10, 1993 (JP) ................................. 5-281008
Oct. 29, 1993 (JP) ................................. 5-271940
Oct. 29, 1993 (JP) ................................. 5-271941
Oct. 29, 1993 (JP) ................................. 5-271942
Oct. 29, 1993 (JP) ................................. 5-272117

(51) Int. Cl.[7] ............................. H04N 9/73; H04N 9/68
(52) U.S. Cl. .................... 348/362; 348/234; 348/229
(58) Field of Search ............................. 348/223, 222, 348/229, 224, 225, 234, 235, 236, 273, 274, 336, 360, 349

(56) References Cited

U.S. PATENT DOCUMENTS

| | | | |
|---|---|---|---|
| 4,614,966 | | 9/1986 | Yunoki et al. ................. 348/282 |
| 4,647,975 | | 3/1987 | Alston et al. .................. 348/222 |
| 4,926,247 | | 5/1990 | Nagasaki et al. .............. 328/262 |
| 5,101,276 | | 3/1992 | Ohta ............................. 348/207 |
| 5,138,458 | | 8/1992 | Nagasaki et al. .............. 348/241 |
| 5,162,914 | * | 11/1992 | Takahashi et al. ......... 358/213.19 |
| 5,162,942 | | 11/1992 | Takahashi et al. ............ 348/229 |
| 5,247,366 | | 9/1993 | Ginosar et al. ................ 348/256 |
| 5,264,940 | | 11/1993 | Komiya et al. ................ 348/229 |
| 5,264,944 | * | 11/1993 | Takemura ...................... 348/224 |
| 5,309,243 | * | 5/1994 | Tsai ............................... 348/221 |
| 5,347,371 | * | 9/1994 | Nishimura et al. ............ 358/453 |
| 5,420,635 | * | 5/1995 | Konishi et al. ................ 348/362 |
| 5,455,621 | * | 10/1995 | Morimura ....................... 348/222 |
| 5,703,644 | * | 12/1997 | Mori et al. ..................... 348/363 |
| 5,729,290 | * | 3/1998 | Tokumitsu et al. ............ 348/349 |
| 5,801,773 | * | 9/1998 | Ikeda ............................. 348/229 |
| 5,828,793 | * | 10/1998 | Mann ............................. 382/284 |

\* cited by examiner

*Primary Examiner*—Wendy Garber
*Assistant Examiner*—Jacqueline Wilson
(74) *Attorney, Agent, or Firm*—Morgan & Finnegan, LLP.

(57) ABSTRACT

An image data processing apparatus includes a controller which matches a dynamic range of image data to be outputted to an output unit to a dynamic range of data and/or to an output characteristic of the output unit so that the data may be processed in the output unit.

18 Claims, 34 Drawing Sheets

PROPER EXPOSURE : MAIN OBJECT IS DARKENED

EXCESSIVE EXPOSURE : BACKGROUND IS WHITENED

COMBINED IMAGE : DYNAMIC RANGE IS ENLARGED

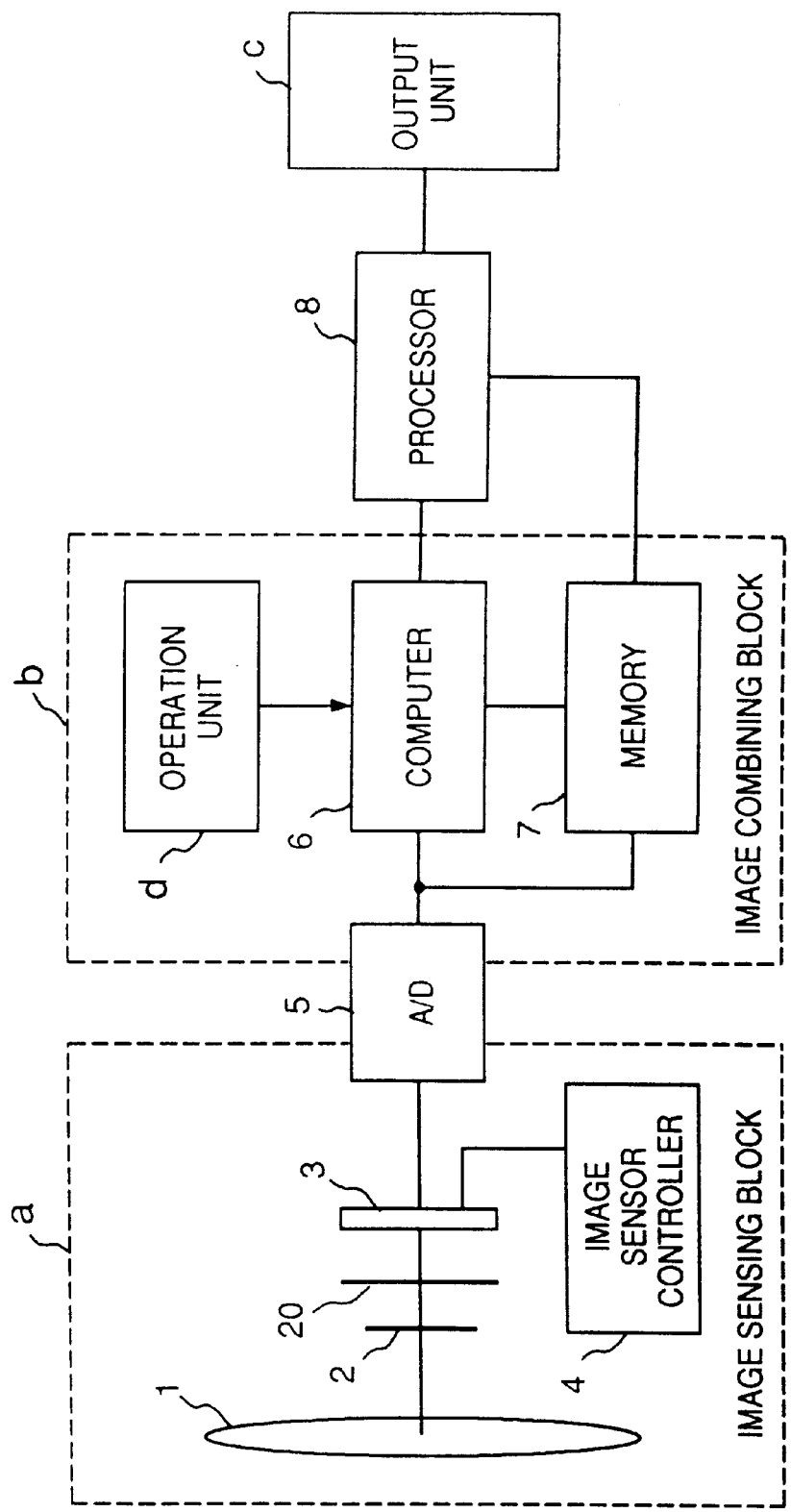

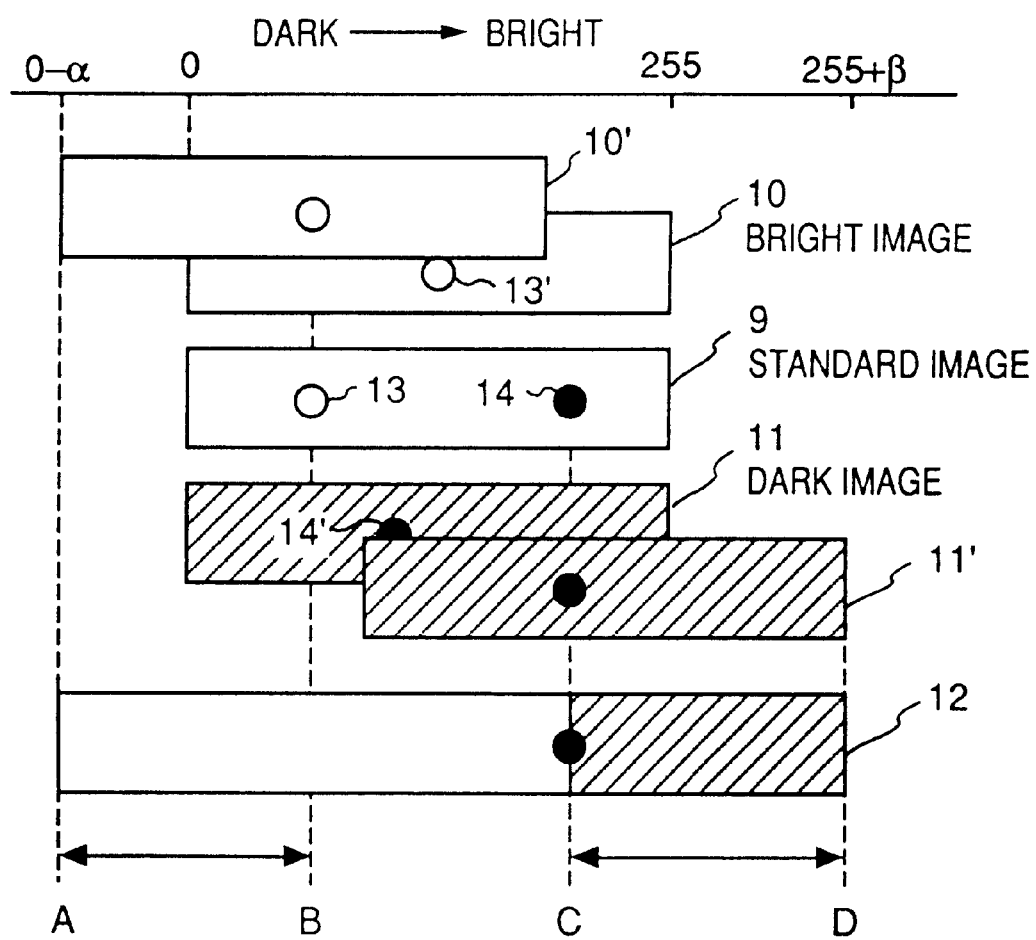

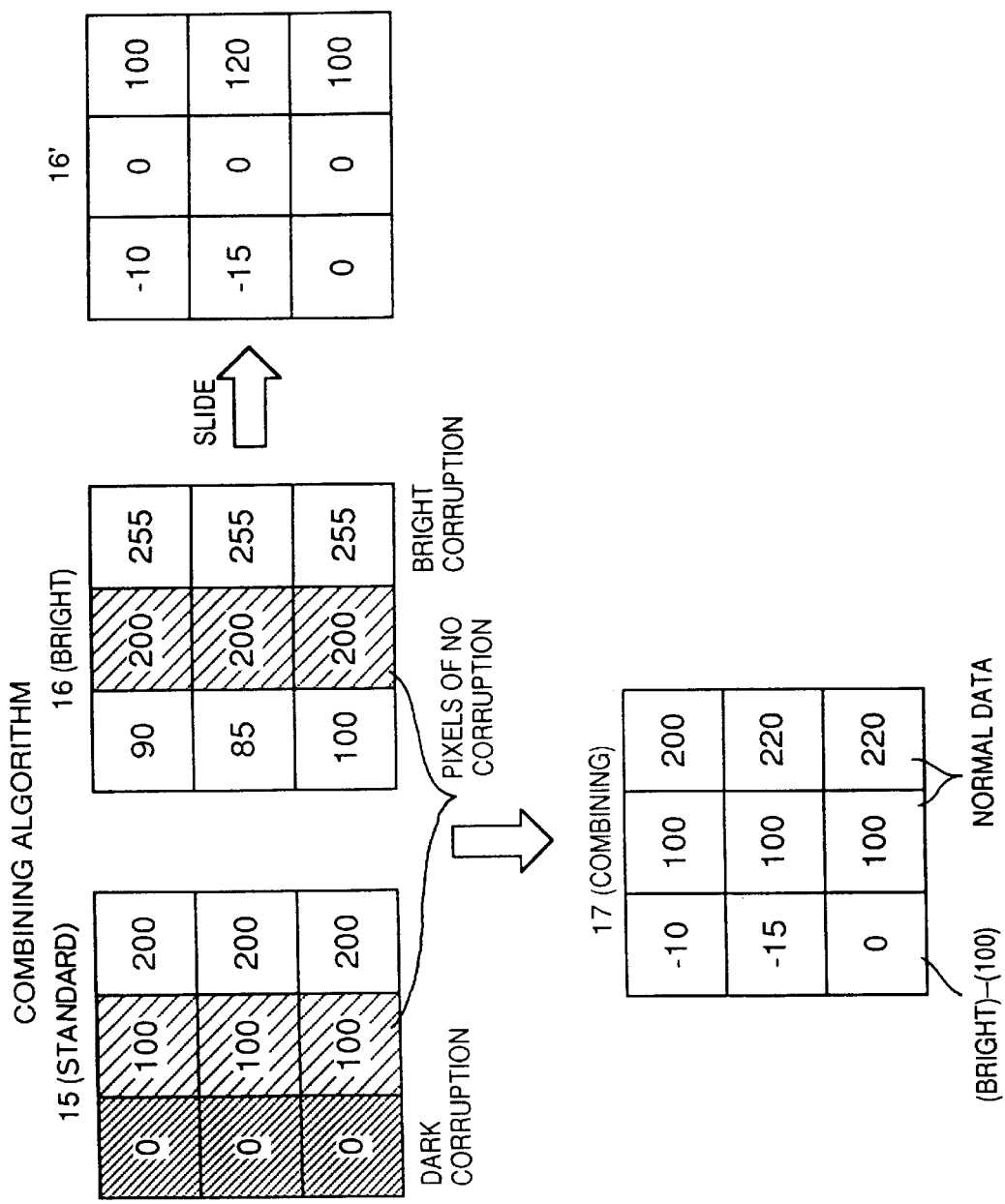

LINEAR COMPRESSION

BRIGHT PORTION IS EMPHASIZED

DARK PORTION IS EMPHASIZED

BRIGHT PORTION IS CUT

DEFINITION OF COORDINATES

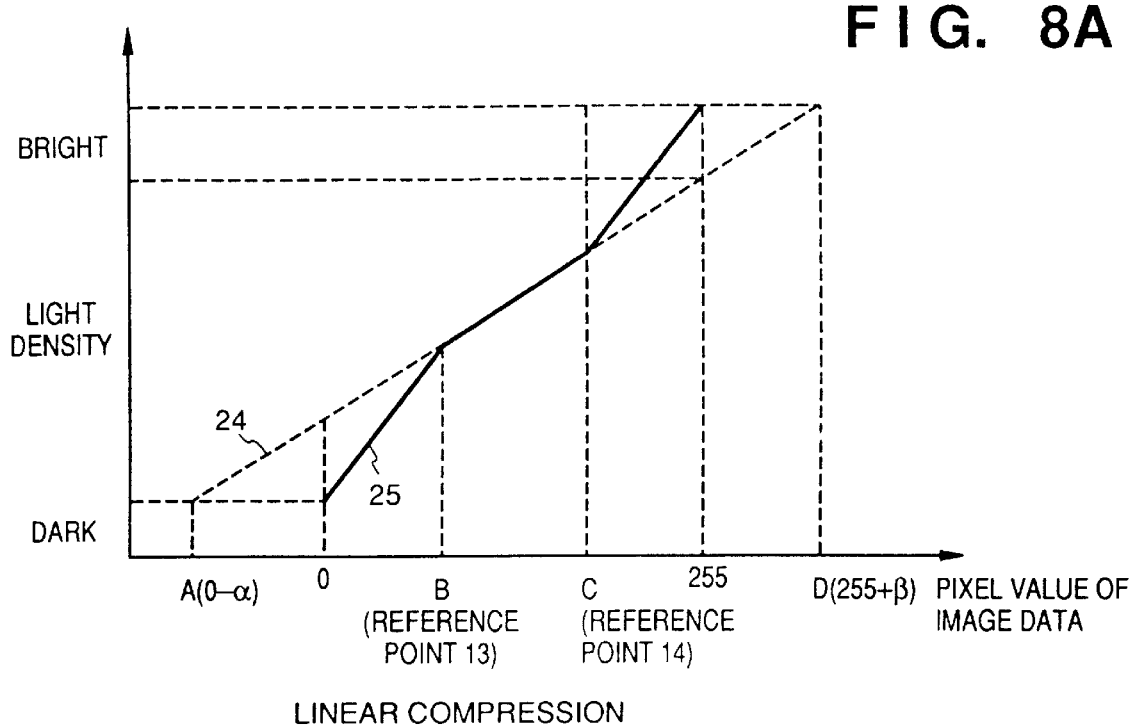
FIG. 8A LINEAR COMPRESSION
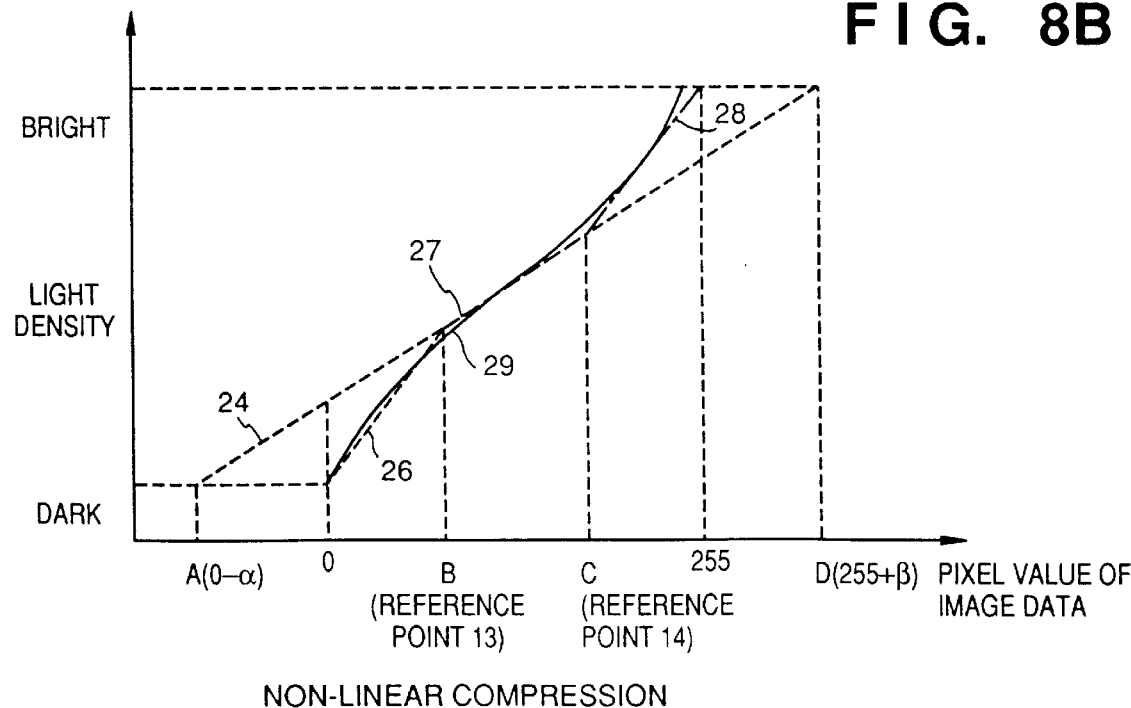
FIG. 8B NON-LINEAR COMPRESSION

IMAGE FORMAT

FIG. 14A
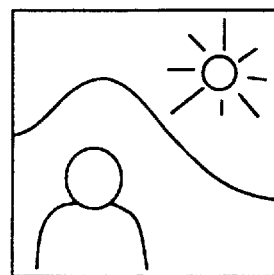
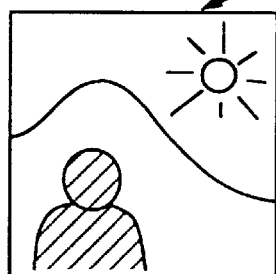
FIG. 14B
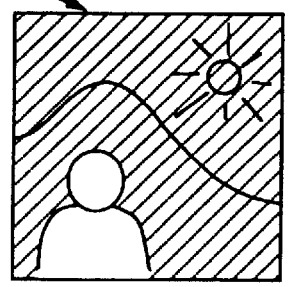
FIG. 14C
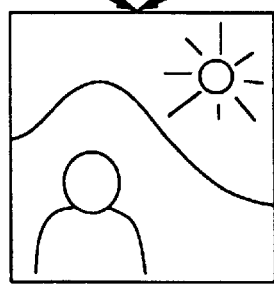
FIG. 14D

FIG. 19

$K = Yg / Yn$   (1)
$Rg = K \times Rn$   (2)
$Gg = K \times Gn$   (3)
$Bg = K \times Bn$   (4)

Ex.   Rn =150   Gn=100   Bn=30 (8bit data)
$Yn = 0.3 \times Rn + 0.59 \times Gn + 0.11 \times Bn$
    $= 107$
$Yg = 110$ $K = 110 / 107$
   $= 1.03$ $Rg = 1.03 \times 150$
    $= 155$
$Gg = 1.03 \times 100$
    $= 103$
$Bg = 1.03 \times 30$
    $= 31$

FIG. 24B

| IMAGE TYPE | PROPER EXPOSURE | | EXCESSIVE EXPOSURE (+2ev) | |
|---|---|---|---|---|
| FIELD | ODD | EVEN | ODD | EVEN |
| NUMBER OF CHARGE READING TIMES | 1 | 2 | 3 | 4 |
| ELECTRONIC SHUTTER | 1/250 | | 1/60 | |

ONE IMAGE SENSING

F I G. 30

K = Yg / Yn    (1)    Ex.  Rn =150   Gn=100   Bn=30 (8bit data)
Rg = K × Rn   (2)          Yn = 0.3×Rn+0.59×Gn+0.11×Bn
Gg = K × Gn   (3)             = 107
Bg = K × Bn   (4)          Yg = 110

K = 110 / 107
                              = 1.03

Rg = 1.03×150
                               = 155
                            Gg = 1.03×100
                               = 103
                            Bg = 1.03×30
                               = 31

IMAGE DATA PROCESSING APPARATUS WHICH CAN COMBINE A PLURALITY OF IMAGES AT DIFFERENT EXPOSURES INTO AN IMAGE WITH A WIDER DYNAMIC RANGE

This is a divisional of application Ser. No. 08/329,538 filed Oct. 26, 1994 now U.S. Pat. No. 5,801,773.

BACKGROUND OF THE INVENTION

Present invention relates to an image data processing apparatus which enlarges the dynamic range of image data to be processed.

Recently, solid-state image sensing devices such as a CCD image sensor are employed as image pick-up devices. However, as the dynamic range of the solid-state image sensing device is smaller than that of a device using silver chloride, image quality may be degraded depending upon image-sensing conditions.

One dynamic-range enlarging method is obtaining a plurality of image data from one scene by sensing with different amount exposure, and combining the plurality of image data by some calculation to obtain combined image data with an enlarged dynamic range. The obtained image data may be outputted by an output device such as a display monitor.

Japanese Patent Application Laid-Open No. 60-52171 discloses combining a plurality of image data obtained with different exposure amounts by adding image signals as shown in FIGS. 1A and 1B. The figures show how dynamic range is enlarged by addition of images signals.

In FIGS. 1A and 1B, the horizontal axis represents the luminance of the object; the vertical axis, the output of the image sensing device; the solid line a, the input-output characteristic of the image sensing device when the exposure amount is increased; and the dotted line b, the input-output characteristic when the exposure amount is decreased. Adding the respective output values in FIG. 1A produces output of enlarged dynamic range as shown in FIG. 1B.

Japanese Patent Application Laid-Open No. 63-306777 discloses cutting out partial image data and combining the cut-out data and another image data to obtain combined image data as shown in FIGS. 2A to 2C. The figures illustrate how cutting off and combining images are made. As shown in FIG. 2A, if the object scene has a wide dynamic range, image sensing with standard exposure obtains image data where the portion of the person (main object) is darkened. Then, the prior art senses the same scene with increased exposure, (the background is whitened), and the main object portion is cut out from the obtained image data, as shown in FIG. 2B. Combining the two image data as shown in FIGS. 2A and 2B provides image data with an enlarged dynamic range as shown in FIG. 2C.

However, these conventional techniques have various problems. First, upon outputting image data having enlarged dynamic range on an output device such as a display monitor or a printer, the dynamic range of the output device may not correspond to that of the combined image. In this case, appropriate compressing operation is performed so that the dynamic range of the combined image is adjusted in accordance with the dynamic range and output characteristic of the output device. However, the improper compressing degrades the image contrast or the balance of brightness, thus provides a very unnatural image, compared with a standard image taken with proper exposure before combining processing. Further, a number of times of compressing and evaluation of compressed image are to be repeated until a good image is obtained.

FIGS. 3A and 3B illustrate a problem raised in the addition of image signals according to Japanese Patent Application Laid-Open No. 60-52171 in FIGS. 1A and 1B. FIGS. 3A and 3B illustrate how brightness increases due to in intermediate bright area. Image sensing elements according to the prior art do not form a continuous sensing area for increased and decreased exposed images, and further the characteristics of the exposures are not equal. Consequently, as shown in FIG. 3B, the result of addition of image signals where the area of intermediate brightness has increased luminance. That is, the image has comparatively high luminance and lacks contrast.

In cutting out and combining of image data according to Japanese Patent Application Laid-Open No. 63-306777, where a dark-corrupted area of standard image data obtained from sensing with proper exposure (FIG. 2A) is replaced with a corresponding area of another image data obtained from sensing with different exposure (FIG. 2B), the combined area yields pseudo outlines due to different luminance levels of the both image data, i.e., the difference between output characteristics of the image sensing device with respect to the object and the luminance level of the background image data. If the luminance levels of the respective images are adjusted to the same level to prevent occurrence of pseudo outlines, the enlargement of dynamic range cannot be fully obtained.

Further, in the conventional image sensing device, upon sensing a moving object or applying sensed image data to a movie, a plurality of image data sensed with different exposures are combined. If a single image sensing device is used for obtaining the plurality of image signals, a time difference between the initial image which is first picked up and the subsequent images picked up later causes loss of simultaneousness in the respective combined images. In order to perform high-speed reading to reduce the time difference between plurality of images, the image sensing device will need a complicated driving mechanism. For these reasons, in a case where a plurality of image sensing devices are used to reduce the time difference between a plurality of images, an ND filter may be used for changing exposure. However, using ND filter upon sensing one scene needs a fixed exposure change, otherwise, the exposure cannot be freely changed in accordance with the illuminance upon the object or the movement of the object. Further, a complicated attachment/detachment mechanism is required for ND filter.

Conventionally, methods for sensing an object and combining a plurality of image data into one image data for one frame have been introduced, however, none has suggested as to preparing a plurality of image data to be combined to obtain high-quality image data with an enlarged dynamic range.

SUMMARY OF THE INVENTION

The present invention has been made in consideration of the above situation, and has as its object to provide an image data processing apparatus which obtains high-quality image data with an enlarged dynamic range.

According to the present invention, the above object is attained by providing an image data processing apparatus comprising: control means for matching a dynamic range of image data to be outputted to an output device to a dynamic range of data which are to be processed in the output device or to an output characteristic of the output device.

Another object of the present invention is to provide an image data processing apparatus which can combine a standard image and a non-standard image into an image with a wider dynamic range, comprising:

means for inputting standard image data obtained by sensing with standard exposure and non-standard image data obtained by sensing with exposure different from the standard exposure;

means for matching a luminance level of the standard image data with that of the non-standard image data; and means for replacing image data of a first area of the standard image data having a luminance level without the predetermined range, with image data of a second area of the non-standard image data having a luminance level within the predetermined range, the image data of said second area corresponding to the image data of said first area.

Preferably, the image data processing apparatus further comprises memory means for storing combining information upon combining the standard image and the non-standard image.

The image data processing apparatus as set forth above can compress image data with a dynamic range enlarged by dynamic range enlarging processing using combining information stored at the time of the combining, so that the dynamic range of the image data corresponds to the dynamic range and output characteristic of an output device using. Thus, the image data processing apparatus easily generates output image data from image data with an enlarged dynamic range in accordance with the dynamic range and output characteristic of the output device. Further, the apparatus enables flexible change of the dynamic range in accordance with a user's output purpose, thus outputs a high-quality image data with a dynamic range larger than that of a standard image.

Another object of the present invention is to provide an image combining apparatus which easily obtains an image with a wide dynamic range.

According to the present invention, the above object is attained by providing an image combining apparatus comprising:

means for inputting a standard image obtained by sensing with standard exposure and a non-standard image obtained by sensing exposure different from the standard exposure of the standard image data;

means for replacing image data of a first area within said standard image having a luminance level without the predetermined range, with image data of a second area within the non-standard image having a luminance level within the predetermined range, the image data of the second area corresponding to the image data of the first area, whereby the standard image and the non-standard image are combined into an image with a wide dynamic range.

Another object of the present invention is to provide an image sensing apparatus having a wide dynamic range and a simple construction to obtain a combined image of high image quality.

According to the present invention, the above object is attained by providing an image sensing apparatus comprising:

a plurality of image sensing devices for receiving light and photoelectric-converting the received light;

separation means, provided at an intermediate position on a light path of image sensing light, for separating an object image for the plurality of image sensing devices;

control means for changing exposure amounts of the plurality of image sensing devices in one image sensing operation; and combining means for combining images obtained at the plurality of image sensing devices into one image.

The image sensing apparatus according to the present invention obtains a plurality of image signals at one image-sensing operation, thus prevents the degradation of image quality upon combining image data using a single image sensing device. Further, this makes high-speed reading unnecessary. As this image sensing apparatus employs an electronic shutter to change exposure, it can flexibly change exposure in accordance with the illuminance upon an object or the movement of the object. Combining the image signals provides an image with a wide dynamic range.

Further, an image sensing apparatus according to the present invention comprising:

a plurality of image sensing devices for receiving light and photoelectric-converting the received light;

separation means, provided at an intermediate position on a light path of image sensing light, for separating an object image for the plurality of image sensing devices;

control means for changing exposure amounts of the plurality of image sensing devices in one image sensing operation;

combining means for combining luminance signals respectively obtained by n image sensing devices of the plurality of image sensing devices whose exposures are made different into a luminance signal for one image; and signal processing means for generating an image signal for one image based on the luminance signal combined by said combining means and color signals obtained at m (m<n) image sensing devices of the plurality of image sensing devices.

The image sensing apparatus according to the present invention obtains a plurality of luminance signals and color signals at one image-sensing operation. The apparatus combines the plurality of luminance signals into a single luminance signal of a wide dynamic range, then applies colors to the signal. Thus, the separation of luminance signals from color signals prevents degradation of color balance by combining image signals, and provides a combined image of excellent image quality.

Another object of the present invention is to provide an image combining apparatus which obtains a combined color image with an enlarged dynamic range without dissolving color balance.

According to the present invention, the above object is attained by providing image combining apparatus for combining a plurality of images obtained by sensing a scene with different exposure amounts to generate an image having a wide dynamic range, comprising:

combining processing means for combining luminance signals of the plurality of images to generate and output a combined luminance signal; and color processing means for inputting the combined luminance signal outputted by said combining processing means, and a luminance signal and color signal of a standard image of the plurality of images obtained by sensing with a proper exposure, and for generating a color signal of a combined image by calculation and outputting the color signal.

The image combining apparatus according to the present invention prevents the degradation of color balance in a combined color image caused by spectral difference among R, G, and B signals upon combining a conventional standard image and a non-standard image with an excessive exposure. Accordingly, the apparatus obtains an excellent combined color image with an enlarged dynamic range.

Another object of the present invention is to provide an image combining apparatus which obtains an image having no pseudo outline from a plurality of images.

According to the present invention, the above object is attained by providing image combining apparatus for combining a plurality of images obtained by sensing a scene with different exposure amounts to generate an image having a wide dynamic range, comprising:

combining means for replacing a dark area of a standard image obtained by sensing with a proper exposure, with an area of a non-standard image obtained by sensing with an increased exposure, the area corresponding to the dark area of the standard image, and for replacing a bright area of the standard image with an area of a non-standard image obtained by sensing with a decreased exposure, the area corresponding to the dark area of the standard image so as to combine an image having a wide dynamic range; and luminance level adjusting means for adjusting a luminance level of the standard image and luminance levels of the non-standard images in each combining operation.

The image combining apparatus having the above construction reduces pseudo outlines in a combined image, caused by incomplete adjustment of luminance levels upon combining images due to the difference among image sensing devices and the unevenness of output of the devices.

Further, the image combining apparatus replaces a dark area or bright area of a standard image data with the corresponding areas of image data obtained from sensing with increased exposure or decreased exposure. The apparatus calculates a threshold, used for cutting out the dark/bright area from the standard image data, at each combining, using the standard image signal and the non-standard image signal. Further, the apparatus calculates at least one threshold value for the cutting out operation. Thus, an excellent combined image is obtained regardless of the type of object or the illuminance upon the object.

Another object of the present invention is to provide an image sensing apparatus and image processing method for the apparatus which obtains a high-quality digital image having a good signal/noise (S/N) ratio, high tone level and a wide dynamic range.

According to the present invention, the above object is attained by providing image sensing apparatus comprising:

conversion means for digitally converting a plurality of images obtained by sensing an object with different exposure amounts;

matching processing means for matching positions of the digitized image data;

level adjusting means for adjusting levels of the position-matching processed image data; and image combining means for combining the level-adjusted image data.

The image sensing apparatus having the above construction combines digital image data obtained from sensing with standard exposure and a plurality of digital image data obtained from simultaneous plural sensing or continuous sensing by changing exposure, by correction of image deviation component, gain controlling to make the levels of the plurality of digital image data obtained from sensing with different exposure amounts, and combining the processed plurality of digital image data, to obtain a digital image having a high S/N ratio, high tone level and a wide dynamic range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the construction of a first embodiment of the present invention;

FIG. 5 is a bar graph showing the concept of a combining algorithm of the first embodiment;

FIG. 6 is an explanatory view of the combining algorithm;

FIGS. 8A and 8B are line graphs showing compression of dynamic range enlargement data;

FIGS. 14A to 14D are explanatory views showing the concept of a dynamic range enlargement by image combining;

FIG. 19 shows the calculation by a color processor the sixth embodiment;

FIG. 24B illustrates the operation of an image sensing device;

FIG. 30 shows the calculation by a significant element of the ninth embodiment;

DETAILED DESCRIPTION OF PREFERRED EMBODIMENTS

Figure 1A:
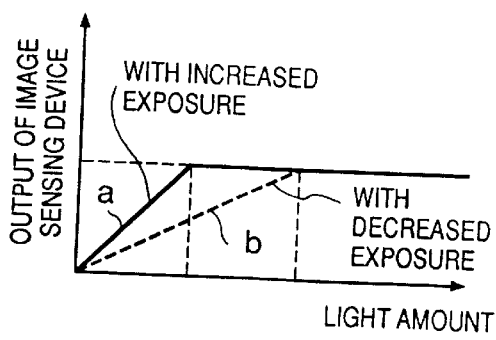
FIGS. 1A and 1B are line graphs showing the concept of a dynamic range enlargement by addition of image signals.

Preferred embodiments of the present invention will be described in detail in accordance with the accompanying drawings.

First Embodiment

FIG. 4 is a block diagram showing the configuration of an image data processing apparatus according to a first embodiment of the present invention. The image data processing apparatus comprises an image sensing block a and an image combining block b. Processed image data with an enlarged dynamic range is outputted from an output unit c.

In FIG. 4, reference numeral 1 denotes a lens where image-sensing light from an object impinges upon; 2, an optical low-pass filter; 3, an image sensing device such as a CCD; 4, an image sensing device controller for controlling the operation of the image sensing device 3; 5, an A/D converter for converting an image signal from the image sensing device 3 into a digital signal; and 6, a computer for image combining process. The computer 6 comprises a dynamic range enlarging unit when initiated by an operation unit d. Numeral 7 denotes a memory for storing combining information when combining an image with an enlarged dynamic range; 8, a data processor for performing control so that the dynamic range of output image data corresponds to the dynamic range or output characteristic of the output unit c; and 20, a color filter.

Next, the operation of the image data processing apparatus will be described. In the image sensing block a, an object image (not shown) is projected through the lens 1, the optical low-pass filter 2 and the color filter 20 on the image sensing device 3. The image sensing device controller 4 sequentially obtains a plurality of image signals with different exposure amounts (lens opening value, storing period etc.), and stores these image signals into the memory 7. Thereafter, the computer 6 reads the image signals out of the memory 7 to combine an image with enlarged dynamic range, and at the same time, stores combining information (image pixel value etc.) required for the combining into the memory 7.

When the dynamic range of the combined image data is to be compressed corresponding to the output characteristic of the output unit c, a user instructs the compression via the operation unit d. The data processor 8 performs a compression operation based on the combining information stored upon the image combining and outputs data. Note that if the user does not instructs dynamic range compression, the data processor 8 adds the combining information to the combined image data and outputs the data, otherwise, merely outputs the combined image data.

Next, the combining algorithm for combining by the computer 6 will be described with reference to the conceptual bar graph in FIG. 5. In FIG. 5, the horizontal axis represents image signal density as well as pixel position.

Bar 9 represents 8-bit image data from the A/D converter 5 obtained by converting an image signal obtained by the image sensing device 3 with standard exposure. This image data obtained with a standard exposure is referred to as "standard image" data. Similarly, bars 10 and 10' represent image data obtained with increased exposure (referred to as "bright image" data); bars 11 and 11', image data obtained with decreased exposure (referred to as "dark image" data). Bar 12 represents image data where the dynamic range is enlarged by a combining process. Since the standard image data 9, the bright image data 10, the dark image data 11 are image data from the same scene, the pixel positions of these image data are corresponding to each other. Accordingly, as shown in FIG. 5, the bars are aligned in the vertical direction. Points 13 and 13', 14 and 14' respectively represent an arbitrary pixel value.

Next, the combining algorithm will be described below on the assumption that the respective image data are 8-bit data from the A/D converter 5 in FIG. 4, and that each pixel of the image data has a value within a range from 0 to 255.

First, combining the standard image 9 and the bright image 10 is considered.

Upon combining images of different luminance levels, i.e., a plurality of images obtained by changing the light amount from the object, the respective luminance levels must correspond to each other. For this purpose, a pixel with no corruption both in the standard image 9 and in the bright image 10 is determined as reference point. The pixel with no corruption means a pixel of a density within the range of sensitivity of the image sensing device. If a reference point of the standard image 9 is 13, as the bright image 10 has more exposure amount than the standard image 9, the image data value of the bright image 10 at the pixel position corresponding to the reference point 13 is larger than the image data value of the standard image 9 at the reference point 13. In the bright image 10, if the point corresponding to the reference point 13 is 13', the relation between the points 13 and 13' is as shown in FIG. 5. To bring the luminance levels of the images 9 and 10 into correspondence, the values of the reference points 13 and 13' are adjusted to the same value. Then, the luminance level of the bright image 10 is slided to the position of the bright image 10'.

Similarly, upon combining the standard image 9 and the dark image 11, to make the luminance levels correspond to each other, a pixel with no corruption 14 of the standard image 9 and 14' of the dark image are determined as reference points. As the dark image 11 was obtained with less exposure than the standard image 9, the reference point 14' value of the dark image 11 is smaller than the reference point 14 value of the standard image 9. Accordingly, the relation between the reference points 14 and 14' is as shown in FIG. 5. To bring the luminance levels of the both image data into correspondence, the values of the reference points 14 and 14' are adjusted to the same value. Then, the dark image 11 is slided to the position of the dark image 11'.

The following describes how to obtain an image with an enlarged dynamic range from the bright image 10', the standard image 9 and dark image 11'. First, in a standard exposure image, (e.g., the standard image) an area of luminance level that resides within a predetermined range, and also in a non-standard exposure image (e.g., bright or dark image), an area of luminance level within the predetermined range are extracted. Then, the luminance levels of these areas are adjusted to the same level. Note that "adjusting the luminance levels to the same level" corresponds to "shifting" described above. Note that in this example, the standard exposure image has an area of luminance level without the predetermined range. This area of the standard exposure image is replaced with a corresponding area of the non-standard exposure image (the luminance of this substitute image data must reside within the predetermined range). This replacement attains a combined image of an enlarged dynamic range (12 in FIG. 5).

This replacement operation will be described with reference to FIG. 5 which illustrates the concept of the combining algorithm. The range 0 to B (the reference point 13) of the standard image 9 is replaced with the range A to B (the reference point 13) of the bright image 10', and the range C (the reference point 14) to 255 is replaced with the range C (the reference point 14) to D. Combining the three image data by this operation yields the image data 12 with an enlarged dynamic range.

The dynamic range of the image data 12 is 0–α to 255+β for 8-bit image data.

To obtain the image data 12 and at the same time compress the data corresponding to the output characteristic of the output unit c, in the system of this embodiment, the values (A, 0, B, C, 255 and D) of the reference pixels upon combining are stored into the memory 7. These values are referred to as "combining information". The values are used upon compressing the image data corresponding to the output unit.

Though the dynamic range enlargement shown in FIG. 5 can be realized by various methods or hardware, in the system in FIG. 4, the dynamic range enlargement is performed using the computer 6.

Next, the calculation by the computer 6 shown in FIG. 5 will be described with reference to FIG. 6. In FIG. 6, numeral 15 denotes pixel values of an arbitrary block within a standard image data; 16, pixel values of a block, corresponding to the block 15, within a bright image data; and 17, pixel values of a block obtained from combining the blocks 15 and 16.

First, in order to adjust the luminance level of the block 15 and that of the block 16 to the same level, a pixel of no-corruption (the reference point 13 in FIG. 5) is found in both blocks. In the block 15, the pixel values within the second column is "100", and those of the block 16 are "200". These pixels may be regarded as "non-corrupted pixels".

Accordingly, the pixel of the second column can be regarded as reference point 13 in the block 15, while the pixel of the second column in the block 16 can be regarded as reference array 13'. The level adjustment in FIG. 5 is made by "slide" operation where "100" is subtracted from all the pixel values of the bright image since the difference between the image data of the reference points 13 and 13' is "100" (=200–100). Then, the block 16 of the bright image becomes a block 16' in FIG. 6.

"Combining" is made by filling pixels within a dark corrupted area (the hatched area of pixel value "0" of the block 15 in FIG. 6) with the value of a corresponding area within the "slided" block 16' of the bright image.

Note that though the above description is about the combination of a standard image and a bright image, the combining of a standard image and a dark image is made in a similar manner.

When the output unit c outputs image data having a dynamic range enlarged as described above, if the dynamic range of the output unit c is smaller than that of the combined image data, the dynamic range of the combined image data is compressed before outputting.

FIGS. 7A to 7E show image data represented on perceptive color space as compression examples of image data having a wide dynamic range.

Figure 7A:
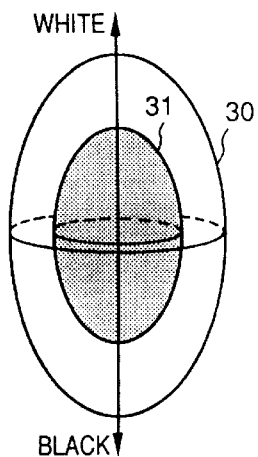
FIGS. 7A to 7E are explanatory views of compression of image data.
Figure 7B:
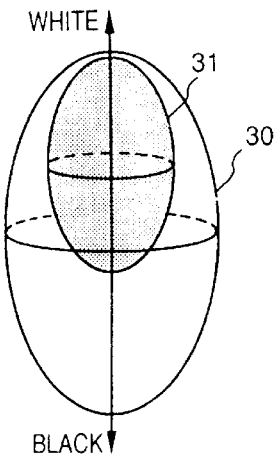
Figure 7C:
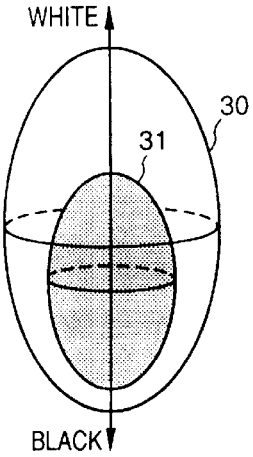
Figure 7D:
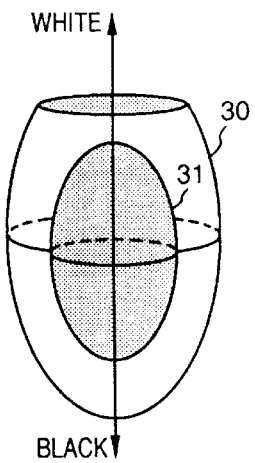
Figure 7E:
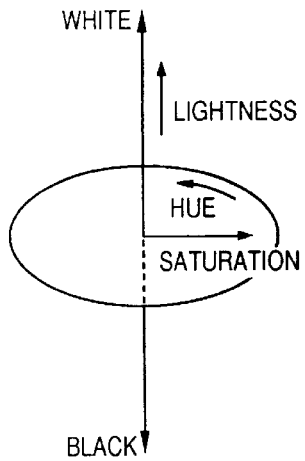

In FIGS. 7A to 7D, numeral 30 denotes combined image data having a dynamic range enlarged by the image combining method of the present embodiment; and 31, image data compressed from the image data 30. FIG. 7E shows the definition of the respective coordinates. FIG. 7A shows linear compression where the image data 31 is obtained by compressing the image data 30 linearly; FIG. 7B, compression with emphasizing a bright portion; FIG. 7C, compression with emphasizing a dark portion; and FIG. 7D, a compression with cutting a bright portion. Upon outputting processed image data to the output unit, it is preferable that the dynamic range of the image data can be freely changed.

Next, the operation of the data processor 8 for compressing image data with an enlarged dynamic range in accordance with the output characteristic of the output unit c will be described with reference to FIGS. 8A and 8B.

In FIGS. 8A and 8B, numeral 24 denotes image data having a dynamic range enlarged using the present combining algorithm; 25 to 29, 8-bit image data compressed from the image data 24; and 26 to 28, asymptotic lines.

In this example, the dynamic range of the combined image data is 8 bits or more (0–α~255+β), and the dynamic range of the output unit c is 8 bits.

In FIG. 8A, the image data represented by the line 24, similar to the combined image data 12 in FIG. 5, is image data having a dynamic range of 8 bits or more (0–α~255+β) as pixel value, obtained from the combining method of the present embodiment. By the above-described combining, a portion between points A and B in the image data 24 has been filled from a bright image, and a portion between points C and D has been filled from a dark image. As the dynamic range of the output unit c is 8 bits or more, and the original standard image data value ranges from "0" to "255" on the graph in FIG. 8A, the image data between the points A and B is compressed to data between "0" to the point B, and the image data between the points C and D is compressed to data between the point C to "255". This compression yields image data having the luminance level approximately the same as that of the standard image data and a dynamic range larger than that of the standard image 9 in FIG. 5. This compression is made using the combining information (A, B, C, D, "0" and "255") previously stored in the memory 7 upon combining.

The compression operation as shown in FIG. 8A performed linearly by the computer 6 is as follows. The portion (A to B) is compressed to the portion ("0" to B) by:

$$New\_Pix = \frac{B - 0}{B - A} \times (Old\_Pix - A) + 0$$

The portion (B to C) does not need compression. The portion (C to D) is compressed to the portion (C to "25") by:

$$New\_Pix = \frac{255 - C}{D - C} \times (Old\_Pix - C) + C$$

Figure 9:
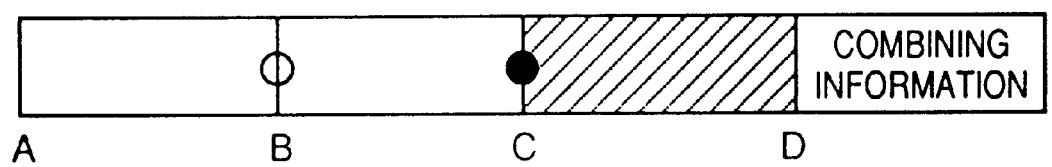
FIG. 9 illustrates an image format.

As well as the above linear compression, non-linear compression may be used by generating the curved line 29 having straight lines 26, 27 and 28 as asymptotic lines and by performing compression based on the line 29. This non-linear compression smoothes a curve indicative of the relation between an output value (image data value) and light intensity, and thus produces a more natural image. If it is hard to generate the curved line 29, an approximate line can be made by connecting short straight lines. Further, these compressing operations can preferably be performed without the present image sensing device. In such case, as shown in FIG. 9, compression information (combining information) is stored into the memory 7 so that an external device such as a computer can read out the stored information, and this external device may perform the above compression operation.

As described above, adjusting the luminance levels of the respective image data before combining yields a natural image which has a balanced luminance without pseudo outline, and has a wide dynamic range. As this combining does not need any complicated calculation, and shortens a time required for the combining operation, the present combining method is applicable to moving images.

Further, since stored are the values of points A, 0, B (reference points), C (reference point), 255 and D which serve as reference indices, compression can be easily made in accordance with the dynamic range of the output unit c based on the coordinates, and further, a dynamic range of one combined image can be freely changed in accordance with the operator's purpose.

Note that in the above-described combining, the number of image data to be combined is not limited to three, but any number is applicable as far as it is more than one.

Modification to First Embodiment

Figure 10:
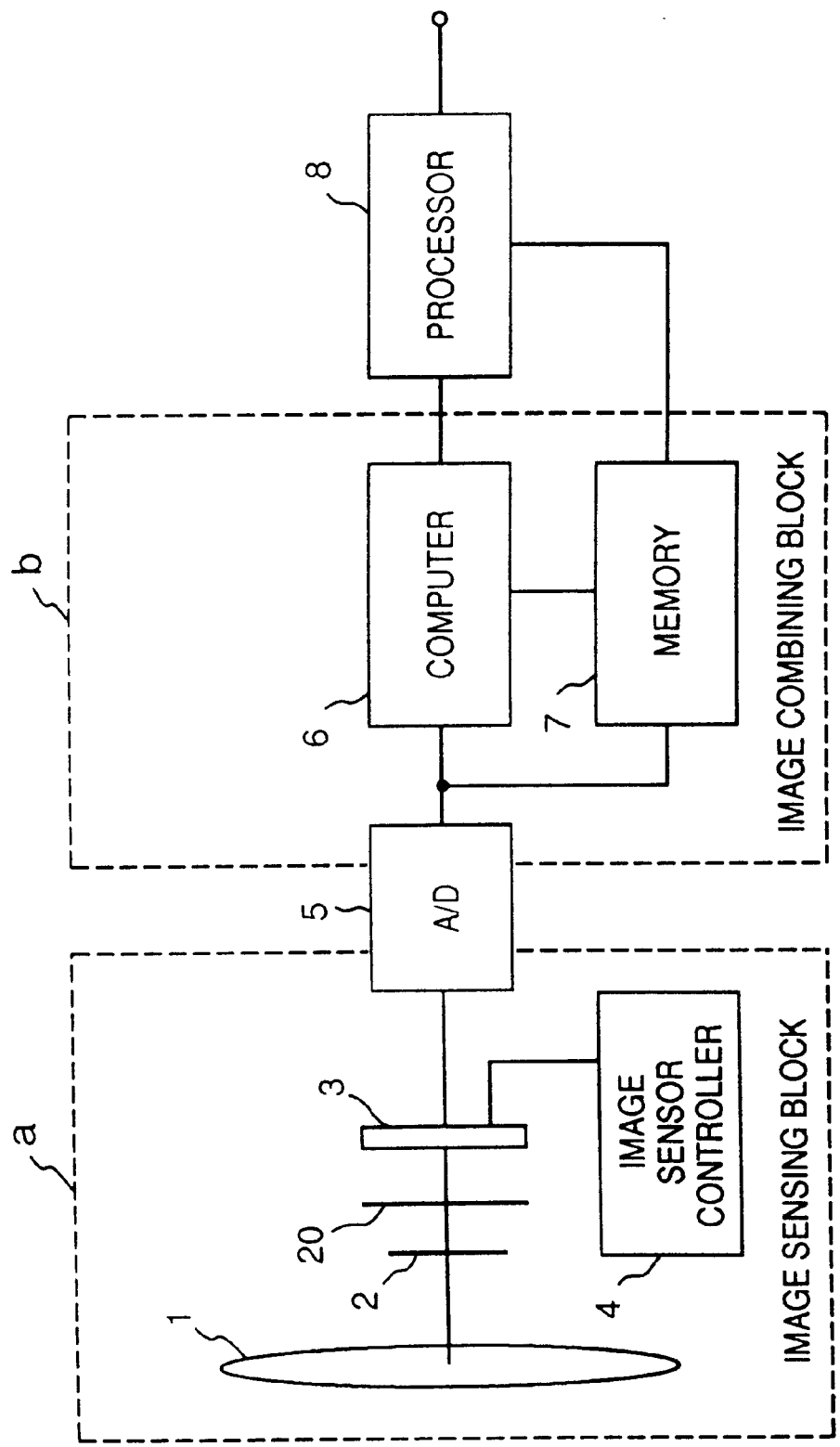
FIG. 10 is a block diagram showing the construction of a modification to the first embodiment.

In the first embodiment, the apparatus has the operation unit, however, it may be omitted. FIG. 10 shows the construction of the apparatus in this case. The omission of the operation unit simplifies the system construction.

Second Embodiment

Figure 11:
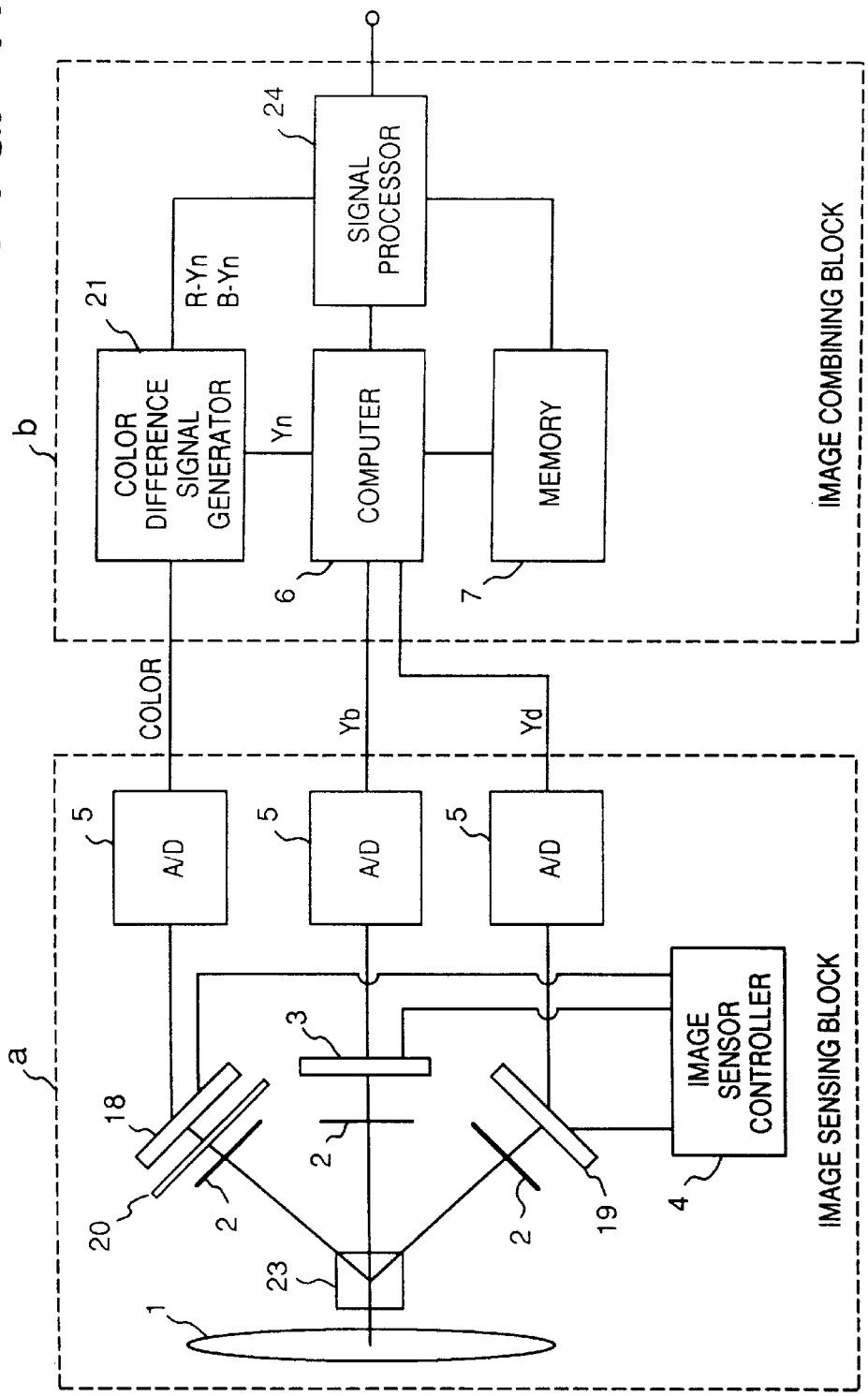
FIG. 11 is a block diagram showing the construction of a second embodiment of the present invention.

Fig. 11 shows the construction of the second embodiment of the present invention. In FIG. 11, the elements corresponding to those in FIG. 4 have the same reference numerals.

In FIG. 11, numeral 18 denotes a first image sensing device; 3, a second image sensing device; 19, a third image sensing device; 20, a color filter; 21, a color difference signal generator for separating a color signal into a luminance signal and a color difference signal; 24, a data processor for generating RGB signals from the color difference signal and the luminance signal; and 23, a prism (light beam splitter) for distributing an image from the lens 1 to the plurality of image sensing devices 3, 18 and 19.

In FIG. 11, an object image (not shown) enters the lens 1, and passes through the prism 23, the optical low-pass filter 2 and the color filter 20, to be projected upon the image sensing devices 18, 3 and 19. The image sensor controller 4 controls the first image sensing device 18 to obtain a color signal with proper exposure from the image sensing device 18, the second image sensing devices 3 to obtain a color signal with increased exposure (hereinafter referred to as "bright luminance" signal), the third image sensing device 19 to obtain a color signal with decreased exposure (hereinafter referred to as "dark luminance" signal), at one image sensing time period. The exposure control is made by providing ND filters of different transmissivity in front of the respective image sensing devices, or by changing storing period of the respective image sensing devices to different periods to each other. The A/D converter 5 converts the obtained respective image signals into digital signals.

Next, the image combining block will be described. In the second embodiment, the combining algorithm is the same as that in FIG. 1. That is, the luminance levels of plurality of image data sensed with different exposure amounts are adjusted to the luminance level of image data sensed with proper exposure amount before combining the plurality of image data.

The color signal from the image sensing device 18 enters the color difference signal generator 21 which generates a luminance signal (hereinafter referred to as "standard luminance" signal) $Y_n$ and color difference signals $R-Y_n$ and $B-Y_n$. The computer 6 calculates difference between the luminance levels of the standard luminance signal $Y_n$ and a bright luminance signal $Y_b$ (the difference between the pixel value of the reference point 13 of the standard image 9 and the pixel value of the reference point 13' of the bright image 10), and stores the calculated difference into the memory 7. Similarly, the difference between the luminance levels of the standard luminance signal $Y_n$ and a dark luminance signal $Y_d$ from the image sensing device 19 is stored into the memory 7.

As the difference between the luminance levels is temporarily stored into the memory, at the next adjustment, the luminance level of a bright or dark luminance signal can be easily adjusted to the luminance level of a standard luminance signal. The computer 6 performs a combining operation, which is similar to the combining to obtain the data 12 in FIG. 5, upon the signal obtained from the above subtraction or addition. Further, the data processor 8 performs compression upon the combined image so that the luminance level of the combined image does not differ from the bit-width of the standard image (8 bits in this example) and, then combining the compressed output and the color difference signal from the color difference signal generator 21, thus obtaining an image with an enlarged dynamic range. At this time, the operation of the data processor 8 is similar to that in the first embodiment.

The combining according to the method above described prevents occurrence of pseudo outlines. Further, the apparatus uses the plurality of image sensing devices to obtain a plurality of image data with different exposure amounts at the same time, and stores the differences among the luminance levels of the respective luminance signals temporarily. This simplifies a calculation in the next combining operation. Accordingly, the image combining by the present construction is applicable to image sensing of a moving object or a movie.

Note that in the above embodiments, the image data processing apparatus is the combination of an image sensing block and an image data combining block, however, a modified embodiment in which these blocks are separated into independent units, the construction is within the gist of the present invention.

Advantages of First and Second Embodiments

As described above, according to the image processing apparatus according to the first and second embodiments, when combining a plurality of image data which were sensed with different exposures into a single image, the luminance levels of non-standard image data are adjusted to that of a standard image data before combining. This prevents occurrence of pseudo outlines in combined image and avoids obtaining unnatural image as combining result due to unbalanced luminance. Accordingly, the apparatus can combine a natural image with wide dynamic range. Further, the apparatus, which employs a simple algorithm as in these embodiments, does not need complicated calculation in the conventional combining methods, such as discrimination of areas. Thus, a time period required for the combining is shortened, and accordingly, this combining is applicable to a moving image.

Further, as the "combining information" such as pixel value used in combining is stored in the memory, image data with an enlarged dynamic range is easily compressed in accordance with a dynamic range or an output characteristic of the output device, and the dynamic range of output image data can be freely changed in accordance with the operator's purpose. Thus, various output devices may be employed for outputting an excellent image having a dynamic range larger than that of a standard image.

In the first and second embodiments, the matching technique of dynamic range is focused. The third to fifth embodiments to be described below relates to combining a plurality of images.

Third Embodiment

Figure 12:
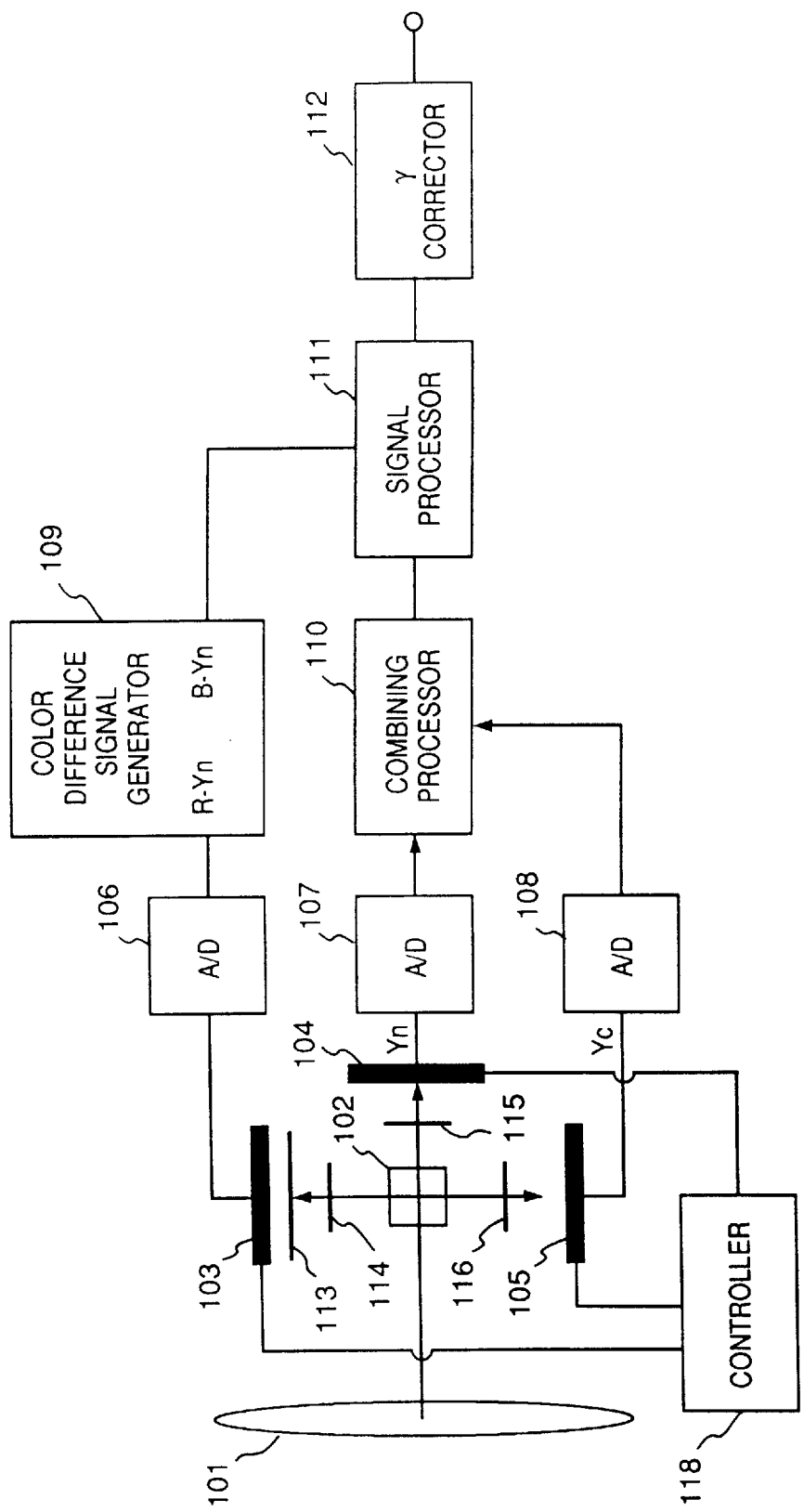
FIG. 12 is a block diagram showing the construction of a third embodiment of the present invention.

FIG. 12 is a block diagram showing the construction of the third embodiment of the present invention.

In FIG. 12, numeral 101 denotes a lens where image-sensing light reflected from an object impinges upon; and 102, a prism provided at the intermediate position of the light path, for separating the image sensing light for image sensing devices 103 to 105. Specifically, the prism separates sensed object image for the image sensing devices 103 to 105, and the image sensing devices 103 to 105 output photoelectric-converted image signals.

Numerals 106 to 108 denote A/D converters for converting the analog signals from the image sensing devices 103 to 105 into digital signals; 109, a color difference signal generator for generating a color difference signal (R–$Y_n$, B–$Y_n$) from the color signal obtained from the first output of the image sensing device 103; 110, a combining processor for combining luminance signals among a plurality of image signals obtained from the output of the second image sensing device 104 and the output of the third image sensing device 105 into a luminance signal for one image frame having a wide dynamic range; and 111, a signal processor for generating an image signal (RGB signal) for one image frame from the combined luminance signal and the color difference signal. The combining processor 110 and the signal processor 111 comprise arithmetic units and the like.

Numeral 112 denotes a γ corrector for performing a γ correction upon the RGB image signal outputted from the signal processor 111; 113, a color filter provided at the photoreceptor of the first image sensing device 103; 114 to 116, optical low-pass filters respectively provided at the intermediate position of the light paths between the prism 102 and the image sensing devices 103 to 105; and 118, a controller for changing the exposure amounts of the image sensing devices 103 to 105 at one image sensing.

Next, the operation of the third embodiment will be described. The sensed object image (not shown) enters the lens 1 and the prism 102 which separates the image in three directions. The separated images are projected on the image sensing devices 103 to 105 through the optical low-pass filters 114 to 116 and the color filter 113. At one image sensing operation, under the exposure control of the controller 118, the first image sensing device 103 outputs a color signal, the second and third image sensing devices 104 and 105 output luminance signals sensed with different exposure amounts. In this embodiment, the exposure control is made by changing the shutter-release speed of the electronic shutter of the second image sensing device 104 and that of the third image sensing device 105, to obtain image signals with the respective different exposure amounts. For example, the image sensing device 104 outputs a signal sensed with proper exposure, the image sensing device 105 outputs a signal sensed with different exposure, and the image sensing device 103 outputs a color signal from sensing with the proper exposure.

Table 1 shows an example of the above-described exposure control. In both of Exposure 1 and Exposure 2 of table 1, the first and second image sensing devices 103 and 104 output a signal obtained with proper exposure, and the third image sensing device 105 outputs a signal obtained with excessive exposure or insufficient exposure.

TABLE 1

| | SHUTTER SPEED | | |
|---|---|---|---|
| | First image sensing device 103 (color + luminance) | Second image sensing device 104 (luminance) | Third image sensing device 105 (luminance) |
| Exposure 1 | 1/250 proper exposure | 1/250 proper exposure | 1/60 excessive exposure |
| Exposure 2 | 1/250 proper exposure | 1/250 proper exposure | 1/1000 insufficient exposure |

Figure 13:
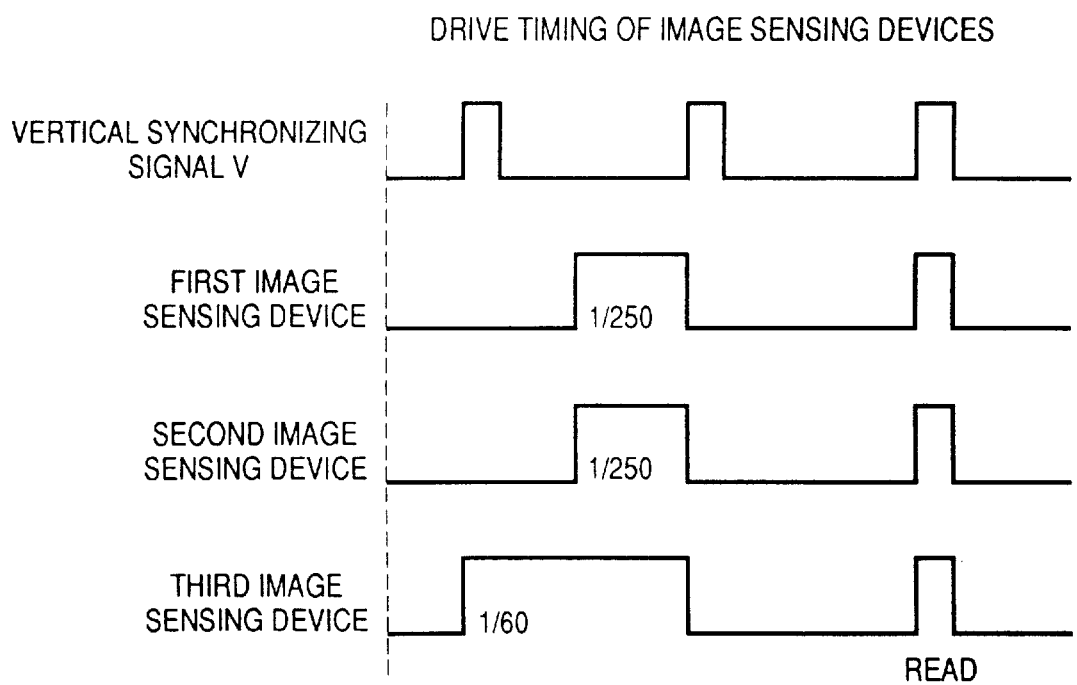
FIG. 13 is a timing chart showing the driving timings of respective image sensing devices in FIG. 12.

FIG. 13 shows the driving timings of the image sensing devices 103 to 105. Note that FIG. 13 shows a case where the third image sensing device 105 performs sensing with excessive exposure (Exposure 1 of Table 1). The respective image sensing devices 103 to 105 perform reading simultaneously in synchronization with a vertical synchronizing signal V. The image signals obtained from the image sensing devices 103 to 105 are converted by the A/D converters 106 to 108 into digital signals.

For example, in a case where an object of a wide dynamic range as shown in FIG. 14A is sensed on the condition of Exposure 1 in Table 1, a luminance signal from the image sensing device 104 by sensing with proper exposure of shutter-release speed 1/250 indicates image data where a dark portion is dark-corrupted as shown in FIG. 14B, while a luminance signal from the image sensing device 105 by sensing with excessive exposure of shutter-release speed 1/60 indicates image data where a bright portion is white-corrupted as shown in FIG. 14C. The combining processor 110 combines the luminance signals from the image sensing devices 104 and 105 to a luminance signal $Y_h$ with a wide dynamic range as shown in FIG. 14D.

On the other hand, the color difference signal generator 109 generates a luminance signal $Y_n$ and a color difference signals R–$Y_n$ and B–$Y_n$ using the color signal from the first image sensing device 103. The signal processor 111 generates RGB signals using the color difference signals R–$Y_n$ and B–$Y_n$ from the color difference signal generator 109 and the luminance signal $Y_h$ from the combining processor 110. The RGB signals are outputted through the y corrector 112. Thus, an image signal with an enlarged dynamic range can be obtained.

Note that if it is not necessary to generate a TV signal such as an NTSC signal, the RGB signal multiplexed with the luminance signal in place of the color difference signal may be provided to an external device such as a computer.

As described above, a single image sensing operation obtains a plurality of image signals. In this regard, the exposure is changed by changing the shutter-release speed of electronic shutter, so that the exposure change width for one scene can be freely changed with respect to the illuminance or movement of an object. Further, as a color signal and luminance signals are obtained from different image sensing devices, the degradation of color balance due to combining is prevented. Note that in this embodiment, the exposure amounts of the respective image sensing devices are changed by changing the shutter-release speed of the electronic shutter, however, such materialistic stop may be employed to change the amount of incident light at each image sensing device.

Note that in this embodiment, the luminance signals are obtained from two image sensing devices, however, the number of image sensing devices for obtaining different luminance signals may be three or more.

Fourth Embodiment

Figure 15:
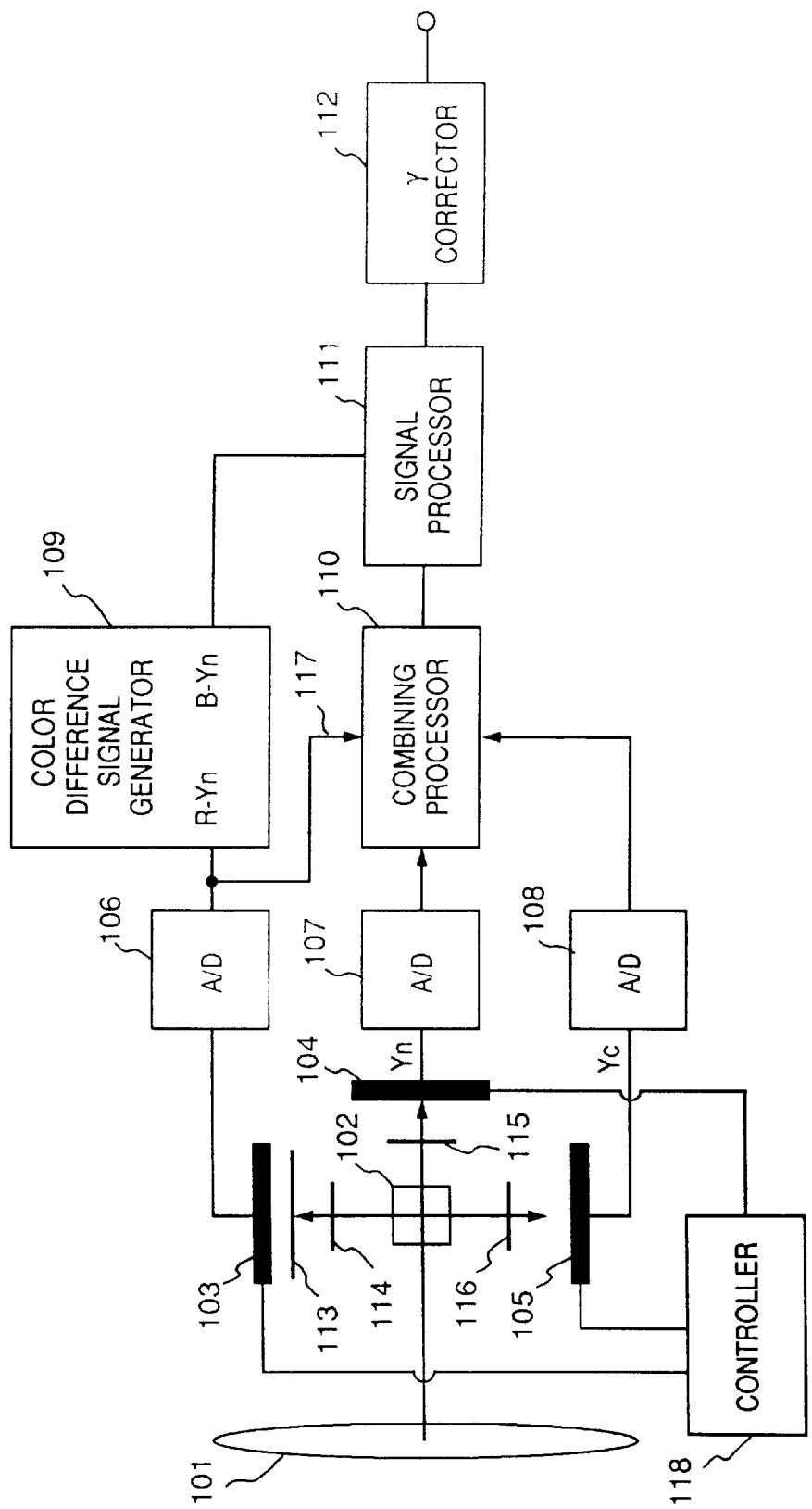
FIG. 15 is a block diagram showing the construction of a fourth embodiment of the present invention.

FIG. 15 is a block diagram showing the construction of the fourth embodiment of the present invention. In FIG. 15, the elements corresponding to those in FIG. 12 have the same reference numerals and the explanations of these elements will be omitted. The difference between this embodiment and the first to third embodiments is that the first image sensing device 103 outputs a luminance signal as well as a color signal. The luminance signal from the image sensing device 103 is inputted to the combining processor 110 through a line 117. The combining processor 110 combines the input signal with the luminance signals from the second and third image sensing devices 104 and 105. Table 2 shows an example of exposure control in the present embodiment.

TABLE 2

| | SHUTTER SPEED | | |
|---|---|---|---|
| | First image sensing device 103 (color + luminance) | Second image sensing device 104 (luminance) | Third image sensing device 105 (luminance) |
| Exposure 1 | 1/250 proper exposure | 1/1000 insufficient exposure | 1/60 excessive exposure |

The exposure control shown in Table 2 shows a case where the first image sensing device 103 performs sensing with proper exposure; the second image sensing device 104, with insufficient exposure; and the third image sensing device 105, with excessive exposure. The image sensing on this condition using n image sensing devices obtains n image signals obtained with different exposure amounts and one color signal, thus reduces the number of image sensing devices. In this embodiment, as one image signal is combined from three image signals, the dynamic range is further enlarged.

Fifth Embodiment

Figure 16:
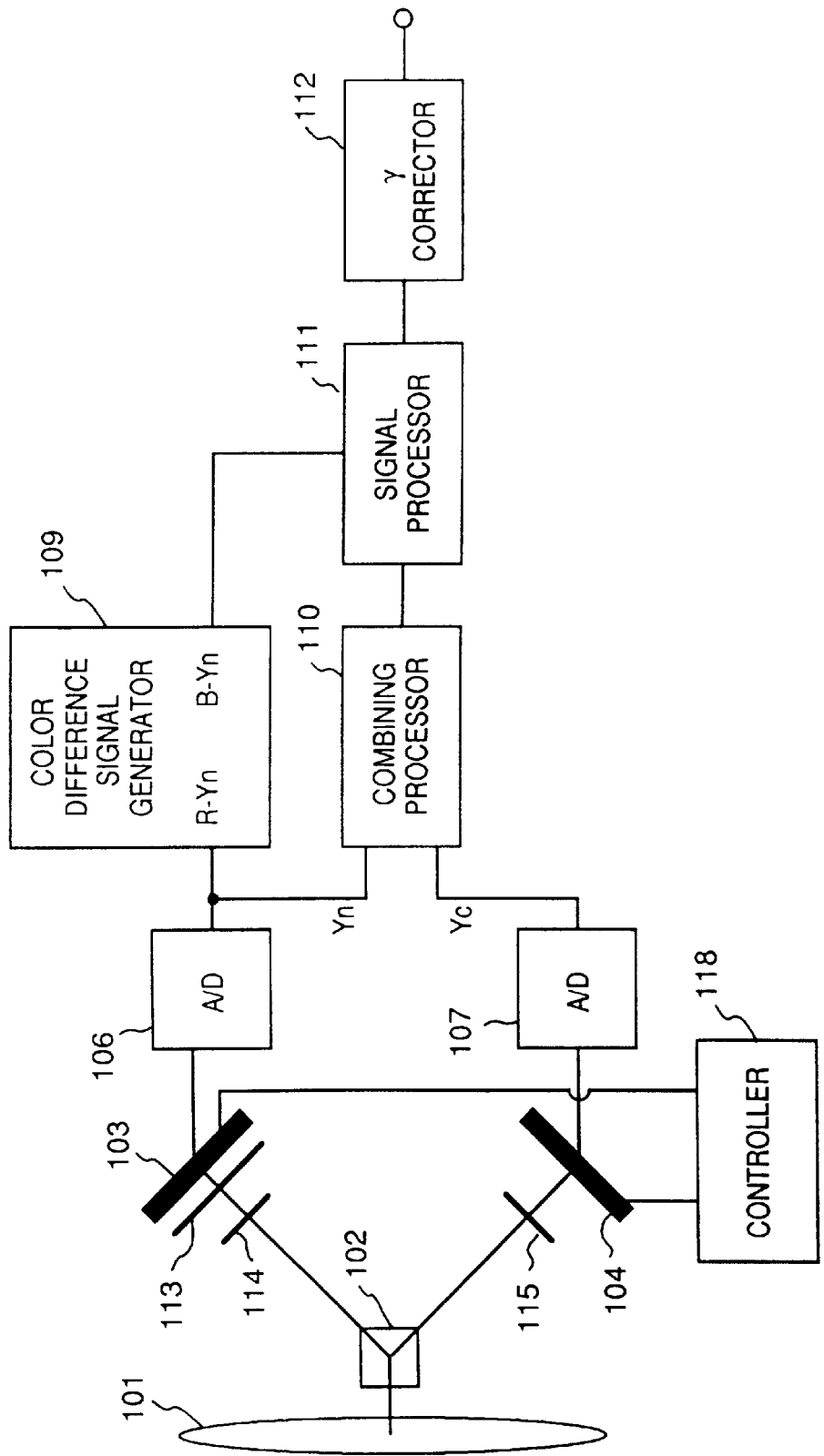
FIG. 16 is a block diagram showing the construction of a fifth embodiment of the present invention.

FIG. 16 is a block diagram showing the construction of the fifth embodiment of the present invention. In this embodiment, the number of the image sensing devices is two. That is, the first image sensing device 103 outputs a luminance signal (proper exposure) and a color signal, and the second image sensing device 104 outputs a luminance signal obtained with different exposure.

Table 3 shows an example of exposure control of the present embodiment. The first image sensing device 103 performs sensing with proper exposure in both Exposure 1 and Exposure 2. The second image sensing device 104 performs sensing with excessive exposure in Exposure 1 and insufficient exposure in Exposure 2.

TABLE 3

| | SHUTTER SPEED | |
|---|---|---|
| | First image sensing device 103 (color + luminance) | Second image sensing device 104 (luminance) |
| Exposure 1 | 1/250 proper exposure | 1/60 excessive exposure |
| Exposure 2 | 1/250 proper exposure | 1/250 insufficient exposure |

Upon the image sensing under the above condition, according to the fourth embodiment can perform the same combining as that in the third embodiment by two image sensing devices. Accordingly, the construction the fourth embodiment is more simple, and this lowers costs.

Advantages of Third to Fifth Embodiments

As described above, according to the present invention, a plurality of image signals are obtained by the image sensing devices of the third to fifth embodiments at one image sensing with different exposure amounts. Even if an object is moving, a natural image can be obtained with a simple construction. Further, an image signal of a wide dynamic range is obtained from a plurality of image signals by sensing images with different exposure amounts and by changing the shutter-release speed of the electronic shutter of the respective image sensing devices. Upon image sensing, the exposure for the respective image signals are freely set to appropriate amounts for combining in accordance with the illuminance of the object. As the color signal and luminance signal are obtained from different image sensing devices and combining is performed by using the only luminance signal, a combined image of high image quality can be obtained, and further, any color change can be prevented.

Figure 1B:
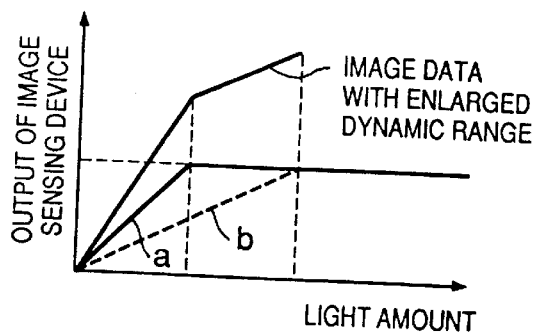
Figure 2A:
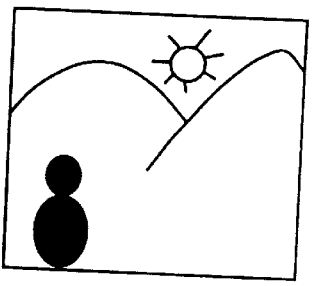
FIGS. 2A to 2C illustrate the concept of another dynamic range enlargement by cutting out partial image data and combining of the cut-out image data and another image data.
Figure 2B:
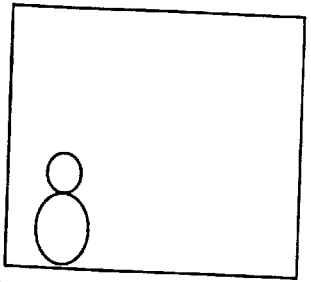
Figure 2C:
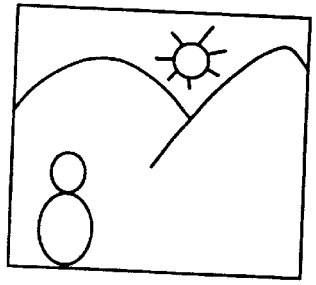
Figure 3A:
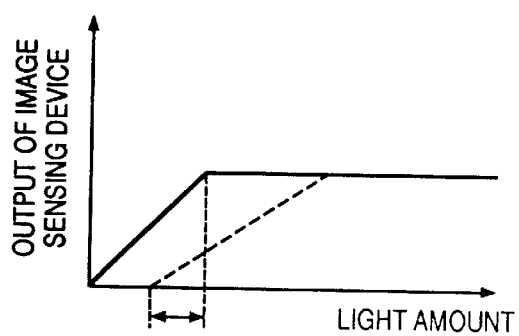
FIGS. 3A to 3B are line graphs showing the rise of luminance value of an intermediate luminance area by the addition of image signals.
Figure 3B:
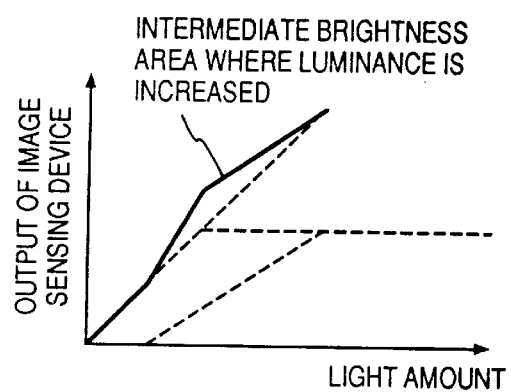

The conventional image combining as described with reference to FIGS. 1 to 3 does not specifically relate to the combining of color image data. We consider a case where color image data is combined by the conventional methods, namely in a case where combining a standard image sensed with proper exposure and a non-standard image sensed with increased exposure, i.e., upon combining an image whose dark portion is dark-corrupted and an image whose bright portion is white-corrupted, in the non-standard image. Due to the difference between the spectral characteristics of the color components of RGB, the overall non-standard image has a cyanic tint. This influences the combined image, and as a result, the combined image where color balance is degraded has a cyanic tint. The sixth and seventh embodiment to be described below are addressed to solve this problem.

Sixth Embodiment

Figure 17:
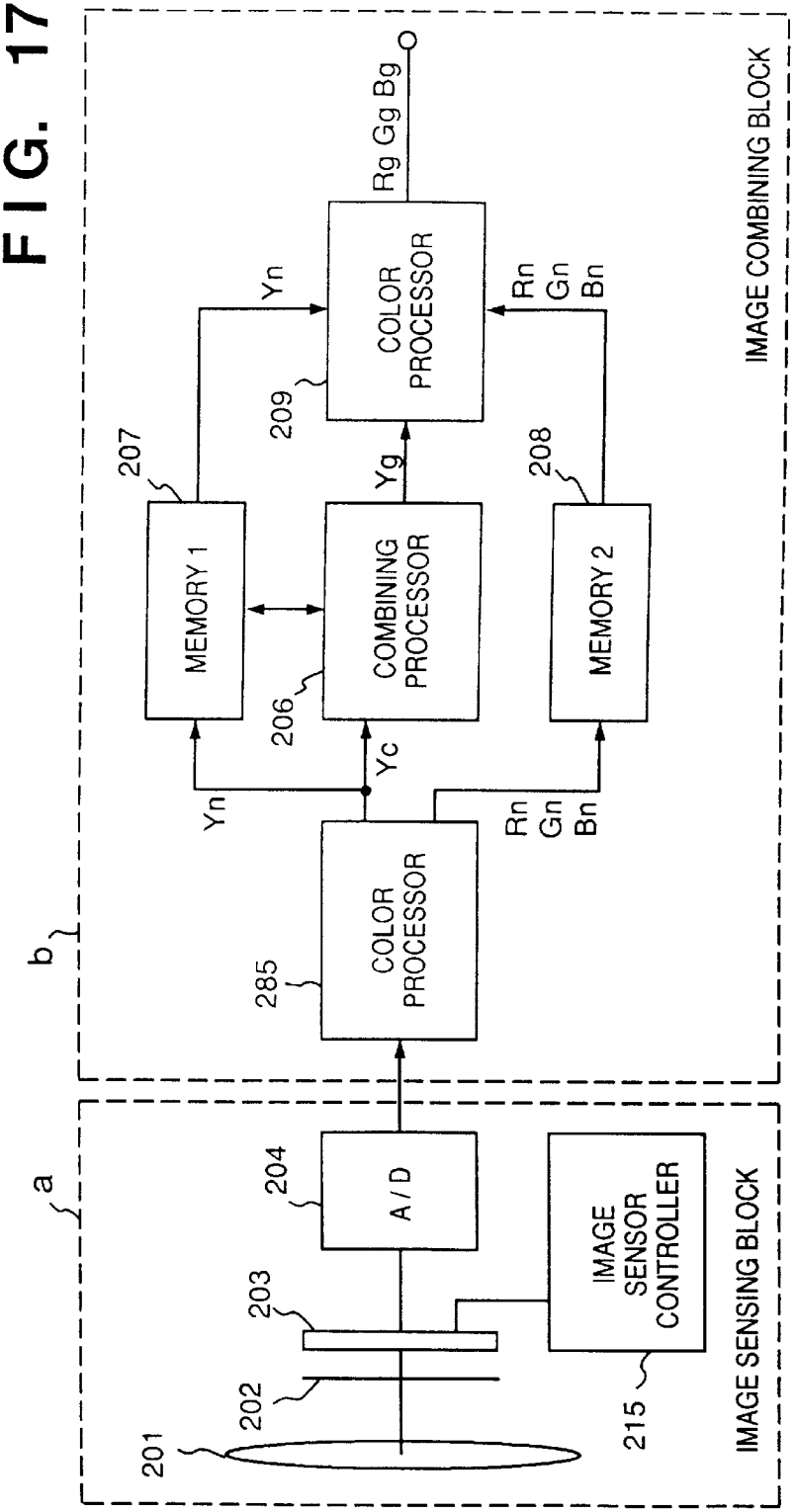
FIG. 17 is a block diagram showing the construction of an image combining apparatus according to a sixth embodiment.

FIG. 17 is a block diagram showing the overall image combining apparatus according to the sixth embodiment of the present invention. The image combining apparatus comprises an image sensing block a and an image combining block b.

In FIG. 17, numeral 201 denotes a lens; 202, an optical low-pass filter; 203, an image sensing device (with a color filter); 204, an A/D converter; 205, a color processor (color separation processing) for generating a luminance signal Y and color signals R, G and B from a digital image signal; 206, a combining processor; 207 and 208, memories; 209, a color processor (color addition) for generating a new image color signal from the luminance signal Y and the color signals R, G and B; and 215, an image sensor controller.

Next, the operation of the image combining apparatus of this embodiment will be described with reference to FIG. 17.

The lens 201 projects an object image (not shown) on the image sensing device 203 via the optical low-pass filter The image sensor controller 215 obtains a plurality of image signals from sensing the same scene at one image sensing operation with different exposure amounts. The A/D converter 204 converts the image signals from the image sensing device 203 into digital signals, and the color processor 205 generates the luminance signal Y and the color signal RGB from the digital signals. As the luminance signal Y, a standard image (image sensed with proper exposure) luminance signal $Y_n$ and a non-standard image (image sensed with improper exposure) luminance signal $Y_c$ are stored into the memory 7. Then, the combining processor 206 performs combining processing to enlarge the dynamic range.

Note that the combining operation of the combining processor 206 may be by any combining methods, such as a well-known signal addition method, a combining method by cutting-out partial image data and combining cut-out data, or the combining method of the first embodiment, i.e., adjusting luminance levels before combining. For example, in the sixth embodiment, the luminance level of a standard image data and that of a non-standard image data are adjusted to the same level, then a dark-corrupted portion or white-corrupted portion of the standard image is replaced with a corresponding non-corrupted portion of the non-standard image.

On the other hand, only the color signals R, G and B are stored into the memory 8. Then, the color processor 209 generates combined color signals $R_g$, $G_g$ and $B_g$ based on a combined luminance signal $Y_g$ from the combining processor 206, the standard luminance signal $Y_n$ from the memory 207 and standard color signals $R_n$, $G_n$ and $B_n$.

Next, the processing operation of the image combining block which is the feature of the present invention will be described with reference to FIG. 18.

Figure 18:
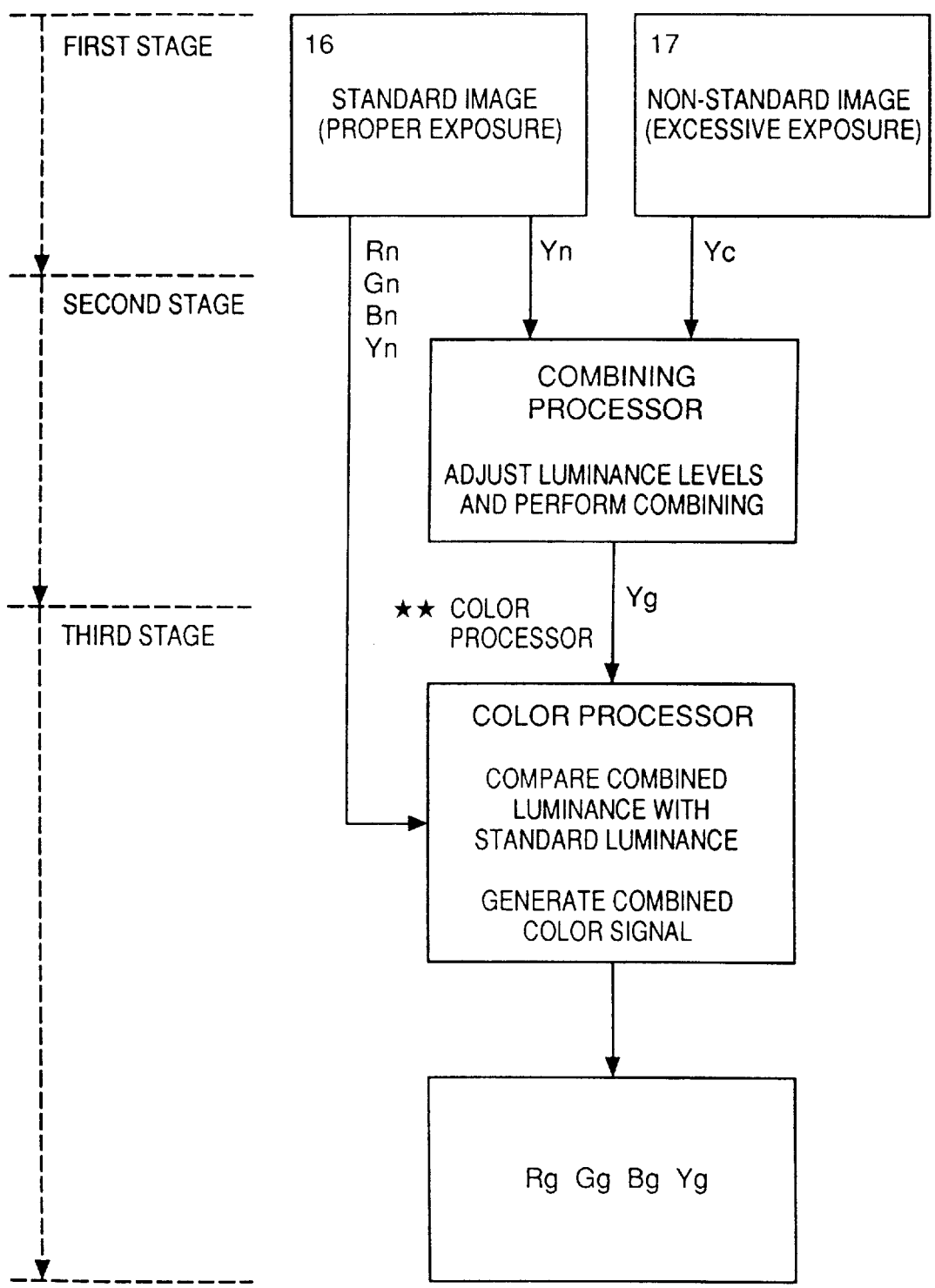
FIG. 18 is an explanatory view of processing by an image combining block of the sixth embodiment.

In FIG. 18, numeral 16 represents a standard image obtained by A/D conversion from an image signal sensed by the image sensing device 203 with proper exposure; and 17, a non-standard image obtained with excessive exposure.

The combining algorithm will be described with reference to FIGS. 18 and 17. Note that the respective image data are converted by the A/D converter 204 into 8-bit data, accordingly, these data have 0 to 255 pixel value.

In the first step, the color processor 205 generates the standard image luminance signal $Y_n$ and the standard color signals $R_n$, $G_n$ and $B_n$. The sixth embodiment employs a single plate color system and a color process corresponding to the system. Next, the color processor 205 generates the non-standard luminance signal $Y_c$. Then the color processor 205 stores the generated signals into the memories 207 and 208.

In the second step, the combining processor 206 combines the standard luminance signal $Y_n$ and the non-standard luminance signal $y_c$ to enlarge dynamic range. Any combining method may be used, however, in this embodiment, the luminance levels of image signals are adjusted to the same level, then a dark-corrupted portion or white-corrupted portion of a standard image is replaced with a corresponding non-corrupted portion of a non-standard image.

In the third step, the color processor 209 compares the combined luminance signal $Y_g$ from the combining processor 206 with the standard luminance signal $Y_n$ from the memory 207, and generates combined color signals $R_g$, $G_g$ and $B_g$ using the standard color signal $R_n$, $G_n$ and $B_n$ from the memory 208.

FIG. 19 shows the calculation to generate the combined color signals.

Initially, as expressed by equation (1) in FIG. 19, the combined luminance signal $Y_g$ and the standard luminance signal $Y_n$ are compared to obtain a coefficient K. Next, as expressed by equations (2) to (4), the standard color signals $R_n$, $G_n$ and $B_n$ are respectively multiplied by the coefficient K to obtain the combined color signals $R_g$, $G_g$ and $B_g$.

FIG. 19 shows an example of calculation on a pixel ($R_n$=150, $G_n$=100, $B_n$=30, $Y_n$=107, $Y_g$=110). Combined color signals R, G and B are obtained by the calculation on all the pixels of the combined luminance signal.

Thus, the combined color signals are generated by multiplying the standard color signals by K, since if the dynamic range of the standard luminance signal is enlarged, the combined luminance signal becomes K-times larger than the standard luminance signal. Accordingly, if the standard color signals are used as combined color signals, the chromaticity (chroma, saturation) of color is lost, and the overall color becomes thin, thus the color balance is degraded. For this reason, in the present embodiment, a color combined image with an enlarged dynamic range can be obtained without no loss of color balance by a construction which multiplies standard color signals by K and enlarges the dynamic range to adjust the chromaticity (chroma, saturation).

Note that in the sixth embodiment, any number of image data equal to or more than two may be combined. In the combining method of this embodiment, an RGB pure color filters are used, however, YMC complementing filters may be used for converting image data into RGB data.

Seventh Embodiment

Figure 20:
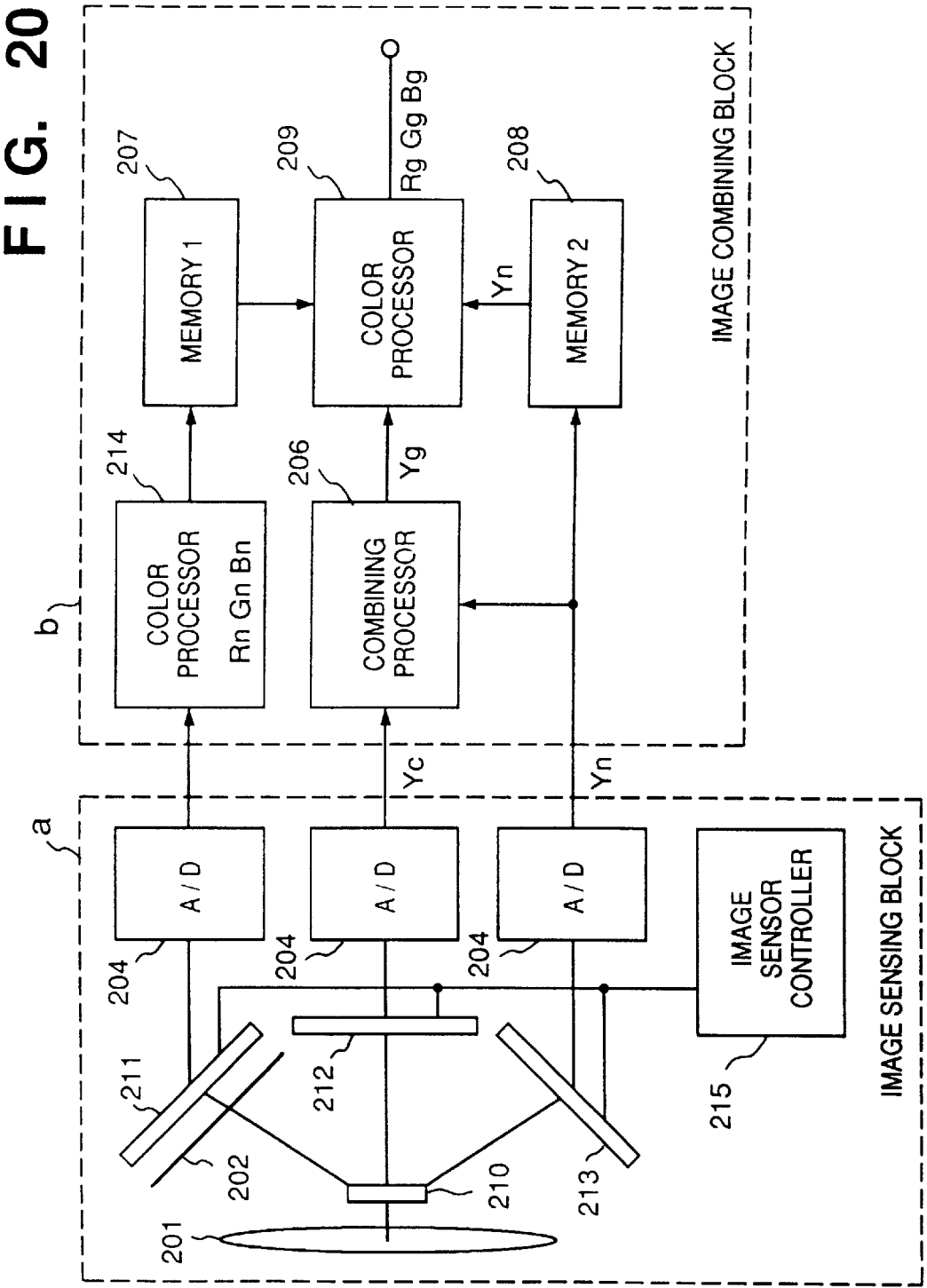
FIG. 20 is a block diagram showing the construction of an image combining block according to a seventh embodiment of the present invention.

FIG. 20 is a block diagram showing the seventh embodiment of the present invention, separated into an image sensing block and an image combining block.

In FIG. 20, the elements corresponding to or the same as these in the sixth embodiment (FIG. 17) have the same reference numerals and the explanations of these elements will be omitted. Numeral 210 denotes a prism for separating an image from the lens into a plurality of images; 211, a first image sensing device (with a color filter); 212, a second image sensing device; 213, a third image sensing device; and 214, a color processor (color generation).

The operation of the seventh embodiment will be described with reference to FIG. 20. An object image (not shown) is projected on the image sensing devices 211 to 213 by the lens 201 and the prism 210. Under the image sensing control of the image sensor controller 215, at one image sensing operation, the first image sensing device 211 obtains a standard color signal with proper exposure; the second image sensing device 212, a luminance signal (non-standard luminance signal) with increased or decreased exposure; and the third image sensing device 213, a luminance signal (standard luminance signal). The A/D converter 204 converts the respective image signals into digital signals.

The color processor 214 generates RGB signals ($R_n$, $G_n$ and $B_n$) based on the signal from the image sensing device 211 and stores the RGB signals into the memory 207. The standard luminance signal $Y_n$ from the image sensing device 213 is stored into the memory 208. The combining processor 206 performs combining processing on the non-standard luminance signal $y_c$ from the image sensing device 212 and the standard luminance signal $Y_n$ from the image sensing device 213 to enlarge dynamic range. The combining algorithm is the same as that of the sixth embodiment.

Then, the color processor 209 generates combined color signals $R_g$, $G_g$ and $B_g$ based on the standard luminance signal $Y_n$ from the memory 208, the combined luminance signal $Y_g$ from the combining processor 206 and the standard color signals $R_n$, $G_n$ and $B_n$ from the memory 207, and then outputs the generated signals. The operation of the color processor 209 is the same as that of the color processor of the second embodiment.

The above construction using multi-plate system obtains image data more easily than a single-plate system according to the sixth embodiment.

Note that the sixth and the seventh embodiments have been described as an image processing apparatus comprising an image sensing block and an image combining block as an integrated unit, however, these blocks may be separated.

Advantages of Sixth and Seventh Embodiments

As described above, according to the sixth and seventh embodiments, when combining a plurality of image data obtained with different exposure amounts into one image data, only luminance signals among image data are used for the combining. Further, the combined image luminance signal, standard image luminance signal and standard image color signal are used for generating a combined image color signal. This process solves the problem, raised in the conventional technique, that, when a standard image and non-standard image(s) are combined, the loss of color balance in an image obtained with excessive exposure due to the difference of spectral characteristics of RGB signals will influence on the combined image data.

Further, these embodiments do not need any complicated calculation, an excellent color image with a wide dynamic range can be obtained by a simple construction.

Improvement of Pseudo Outline

The conventional method in which the dynamic-range of solid-state imaging device is enlarged, obtains a plurality of images from one scene with different exposure amounts and combines these image data with some calculation to obtain an image with an enlarged dynamic range.

FIGS. 21A to 21C and FIGS. 22A to 22C show a typical example of this conventional method.

Figure 21A:
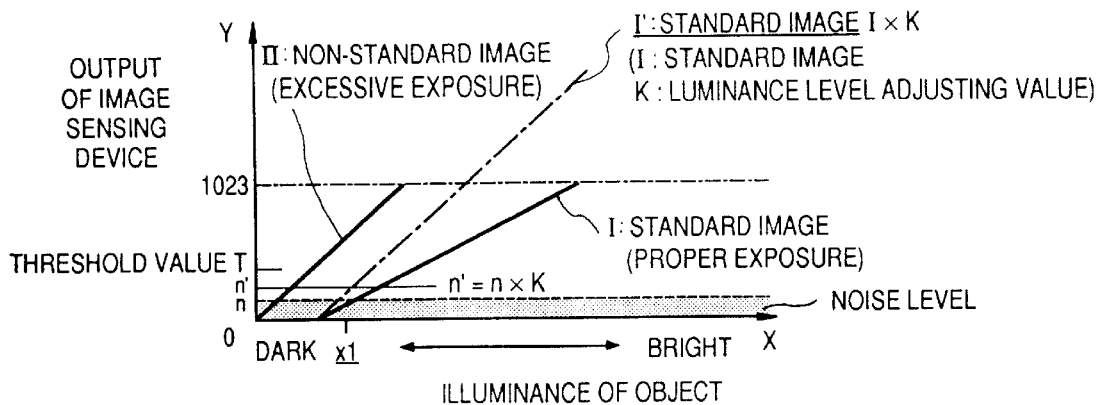
FIGS. 21A to 21C are line graphs showing an example of conventional image combining.
Figure 21B:
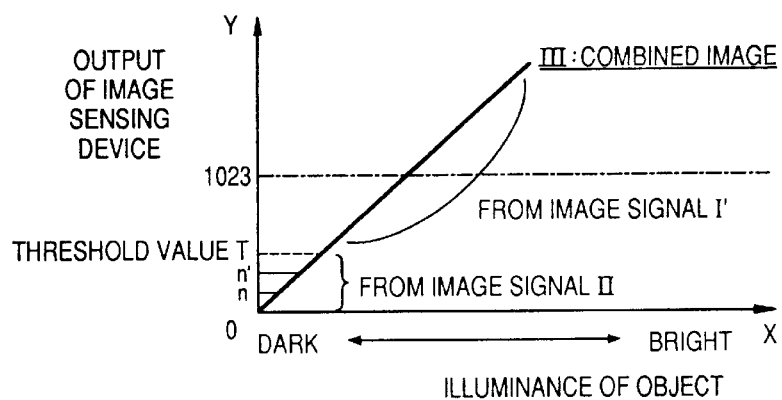
Figure 21C:
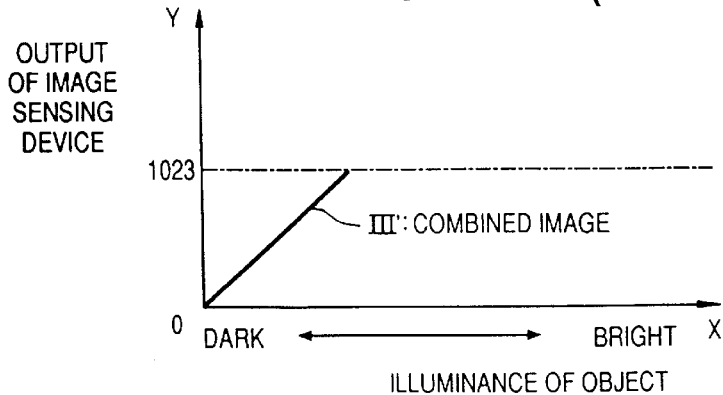

FIGS. 21A to 21C illustrate to combine of two images obtained by sensing the same objective scene, a standard image I sensed with proper exposure and a non-standard image II sensed with excessive exposure. FIG. 21A is a graph showing the two image data. In the graph, the x-axis denotes the illuminance of the object, the y-axis, the output of image sensing device. The outline of this method is as follows. The graph shows that at position "x1" on the x-axis, the output of the image sensing device with proper exposure (image data I) is at a noise level, while the image sensing output exhibits proper value for the image (image data II) with increased exposure. The signals of the standard image I at "0" to the noise level are replaced with the non-standard image II, thus an image signal with an enlarged dynamic range is obtained. Then, as shown in FIG. 21A, a standard image I' the inclination of which is I'×K is obtained by multiplying the slope of the standard image I by a predetermined luminance level adjusting factor K so that the slope of the standard image I will become parallel to the slope of the non-standard image II. Hereinafter this calculation will be referred to as "luminance level adjustment". The noise level of the standard image I' is n×K. Then, an arbitrary threshold T is taken above the noise level n×K value. As shown in FIG. 21B, data below the threshold T is replaced with the non-standard image signal II. This eliminates the noise between the levels n to n' (=n×K). As the slope of the combined image is a K-multiple of the standard image I, the slope of the combined image is multiplied by 1/K, so that the luminance level is readjusted to that of the standard image I. Thus, combined image of low-noise and enlarged dynamic range can be obtained.

Figure 22A:
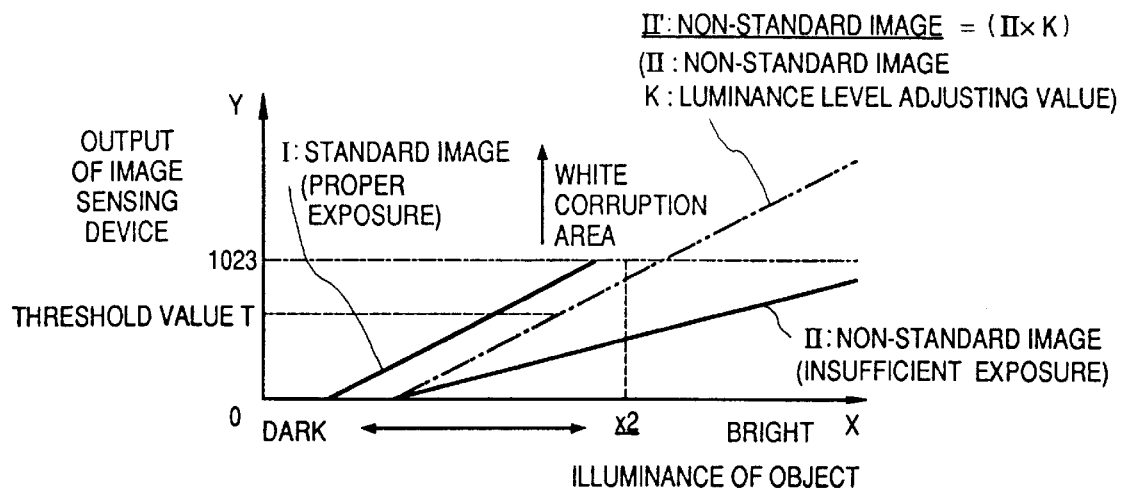
FIGS. 22A to 22C are line graphs showing another example of conventional image combining.
Figure 22B:
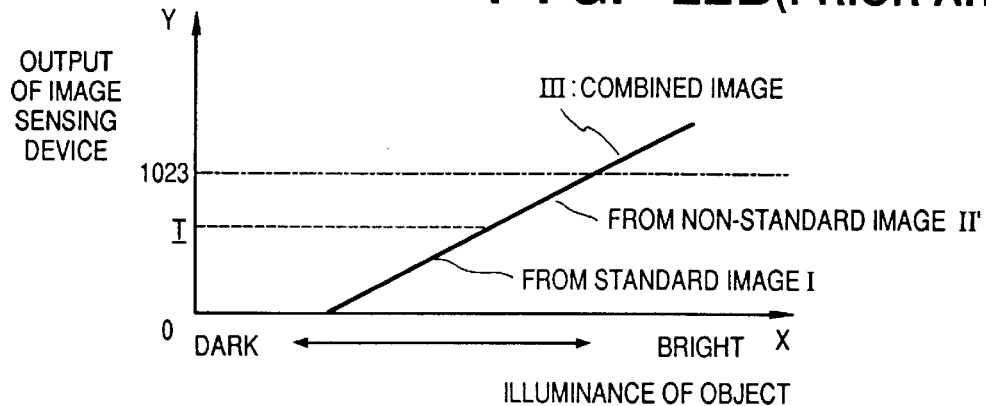
Figure 22C:
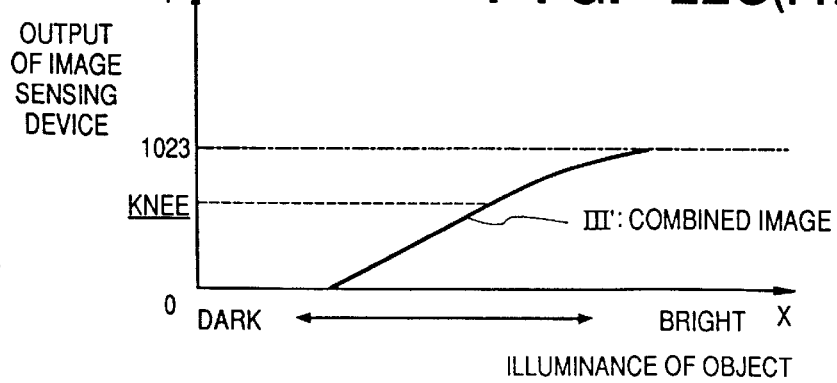

FIGS. 22A to 22C illustrate to combine a standard image I obtained by sensing with proper exposure and a non-standard image II obtained by sensing with decreased exposure.

In FIG. 22A similarly to FIGS. 21A to 21C, along a line at position "x2" on the object illuminance axis, the standard image I has a white-corruption level, while the non-standard image II has a proper value. Then, the slope of the non-standard image II is multiplied by the luminance level adjusting factor K, so that the luminance level of the non-standard image II becomes parallel to the slope of the standard image I, thus a non-standard image II' is obtained. As shown in FIG. 22B, an arbitrary threshold T is taken, and an area of the standard image I above the threshold T is replaced with the non-standard image II'. Compared with the standard image I in FIG. 22A, the combined image data has the same luminance level (slope), however, the combined image data does not have the same 10-bit width, an appropriate knee point is taken as shown in FIG. 22C, thus the bright area is compressed with keeping the adjusted slope.

The above processing according to the conventional method obtains image data which has enlarged dynamic range but has no white corruption. However, a predetermined value is used in the "luminance level adjustment" calculation according to the method. For example, if an exposure amount for standard image is twice times as that for non-standard image, or vice versa, any of these signals is multiplied by "$2^2$" (="4") or "¼".

Figure 23A:
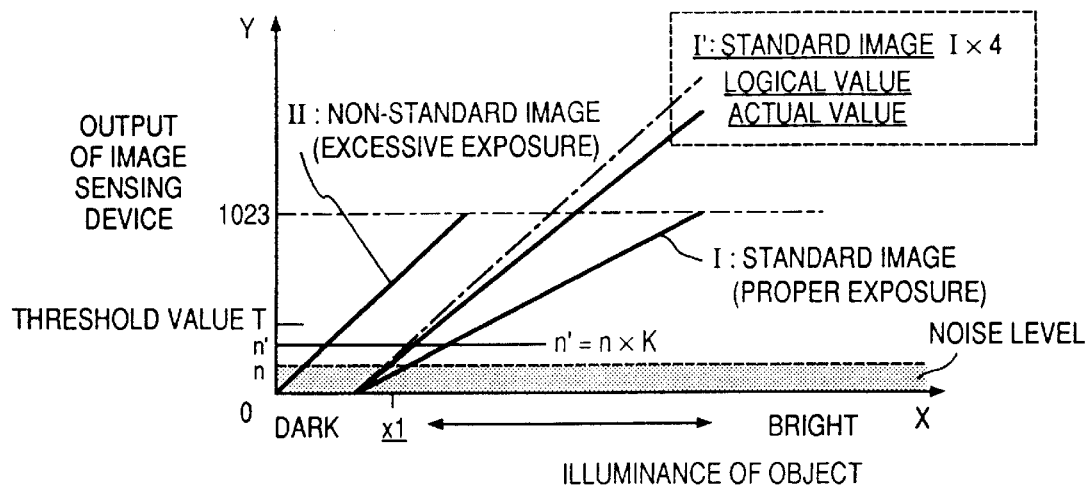
FIGS. 23A and 23B are line graphs showing the occurrence of pseudo outlines by the conventional image combining.
Figure 23B:
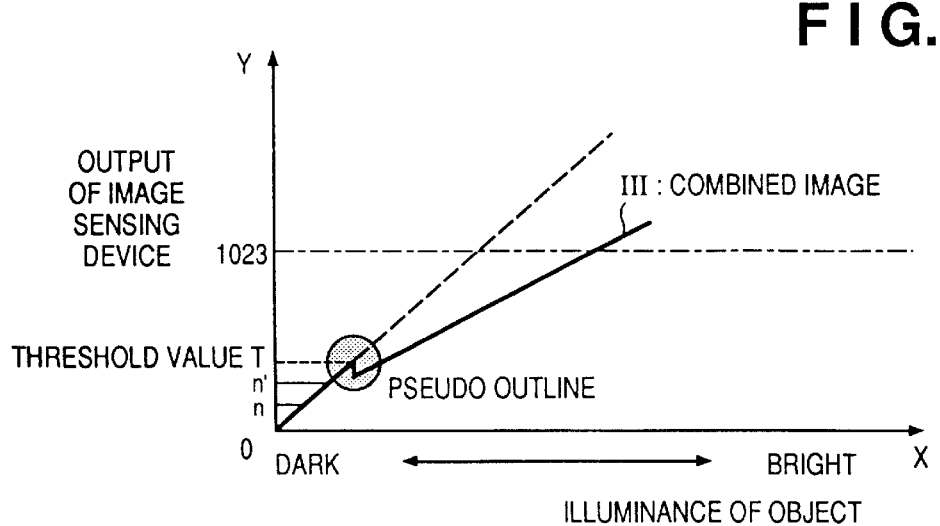

FIGS. 23A and 23B show a reason why pseudo outlines appear in the image after it is combined by the above conventional method is made.

In FIG. 23A, the standard image I is multiplied by the luminance level adjusting factor K to adjust the slope of the standard image I to that of the non-standard image II. Theoretically, if K is "4", the slope of the image I will become accorded to that of the image II. However, actually, the slope of the image I does not become the same as that of the image II because the output characteristic of a sensing element with respect to luminance of the object is different from each other and because every output characteristic minutely varies in accordance with brightness of the object. Consequently, if images having slightly different slopes are combined, pseudo outlines appear on the combined image at the position of threshold T, as shown in FIG. 23B.

Furthermore, in the above conventional method, as dark portions or bright portions in a standard image are generated by means of division using a predetermined threshold, pseudo outlines may occur to the combined image depending upon the characteristic of image sensing device or the object, as occur in the above luminance level adjustment.

Accordingly, the eighth to tenth embodiments of the present invention described below mainly are directed to an elimination of this pseudo-outline problem. The pseudo-outlines are eliminated by matching luminance levels in those embodiments.

Eighth Embodiment

Figure 24A:
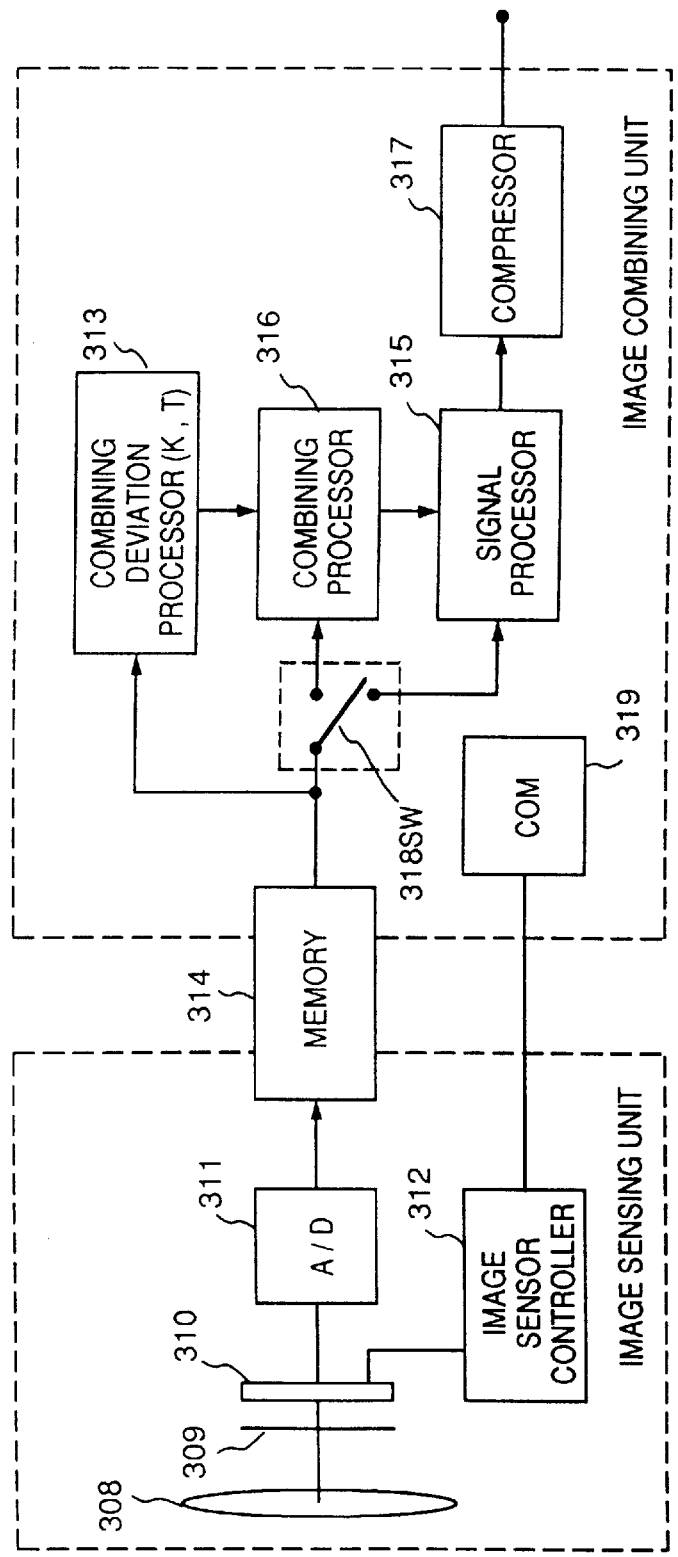
FIG. 24A is a block diagram showing the construction of an image data processing apparatus according to an eighth embodiment of the present invention.

FIG. 24A shows the construction of an image processing apparatus comprising separate image sensing unit and image combining unit.

In FIG. 24A, numeral 308 denotes a lens; 309, an optical low-pass filter; 310, a solid-state image sensing device; 311, an A/D converter; 312, an image sensor controller; 313, a combining deviation processor; 314, a memory; 315, a signal processor; 316, a combining processor; 317, a compressor; 318, a switch; and 319, a computer for controlling the processing of the image processing apparatus.

The operation of the apparatus will be described with reference to FIG. 24A. An object image (not shown) is projected on the image sensing device 310 by the lens 308 through the optical low-pass filter 309. Upon enlarging dynamic range, the image sensor controller 312 controls image sensing to obtain a plurality of image signals at one image sensing operation with different exposure amounts.

FIG. 24B shows the operation of the image sensing device 310. As shown in FIG. 24B, two image signals are obtained with one image sensing operation while the diaphragm is fixed.

The two image signals are, for the sake of simplicity, a standard image signal I obtained by sensing with proper exposure and a non-standard image signal II obtained by sensing with excessive exposure. If a exposure is controlled by diaphragm in place of electronic shutter-release speed, combining is difficult because of different depths of the standard and non-standard images. In addition, controlling the diaphragm is more complicated than controlling the electronic shutter. Accordingly, the present embodiment controls the exposure using the electronic shutter.

In FIG. 24A, the image signals I and II obtained from the image sensing device 310 are respectively converted by the A/D converter 311 into digital signals and stored into the memory 314. If image combining is not to be performed, the computer 319 controls the switch 318 so that the signal processor 315 converts the image signals from the memory into a luminance signal Y or R, G and B signals, then the compressor 317 compresses the signals in correspondence with the bit-width of an output device and outputs the compressed signals. When a dynamic range is enlarged, the combining deviation processor 313 calculates a luminance level adjusting factor K and a threshold T referring to the image signals I and II stored in the memory 314. Next, the combining processor 316 combines the image signals I and II, then the signal processor 315 converts the combined image signal into the luminance signal Y or R, G and B signals, and the compressor 317 compresses the signals and outputs the compressed signals. In FIG. 24A, the image combining unit may be constructed with electric circuits, otherwise, the operation of the unit may be performed by computer using software.

Next, in FIG. 24A, the combining method and calculation of luminance level adjusting factor and threshold by the combining deviation processor 313 will be described with reference to FIGS. 25A and 25B and FIGS. 26 to 28.

Figure 25A:
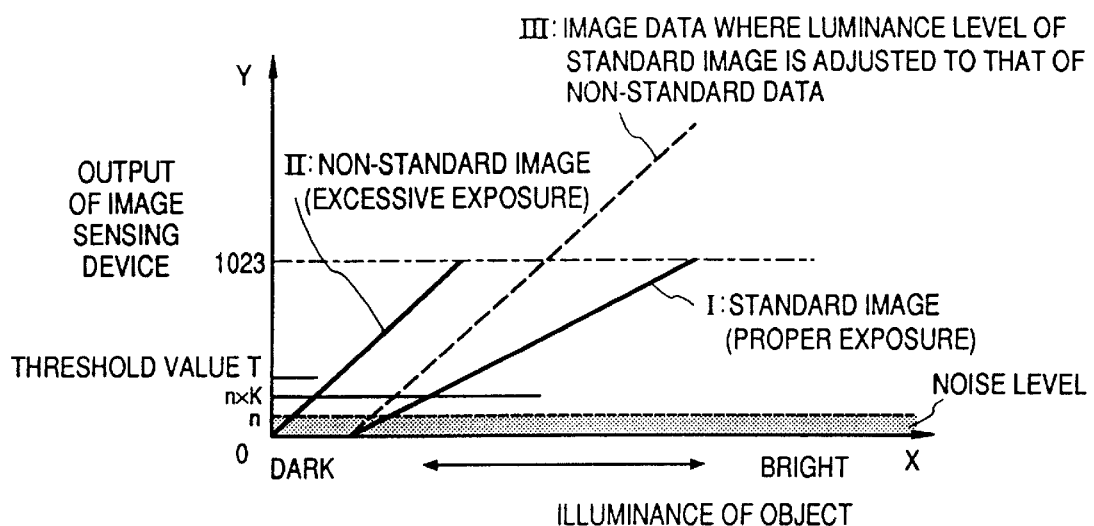
FIGS. 25A and 25B schematically illustrate the processing by an image combining block of the eighth embodiment.
Figure 25B:
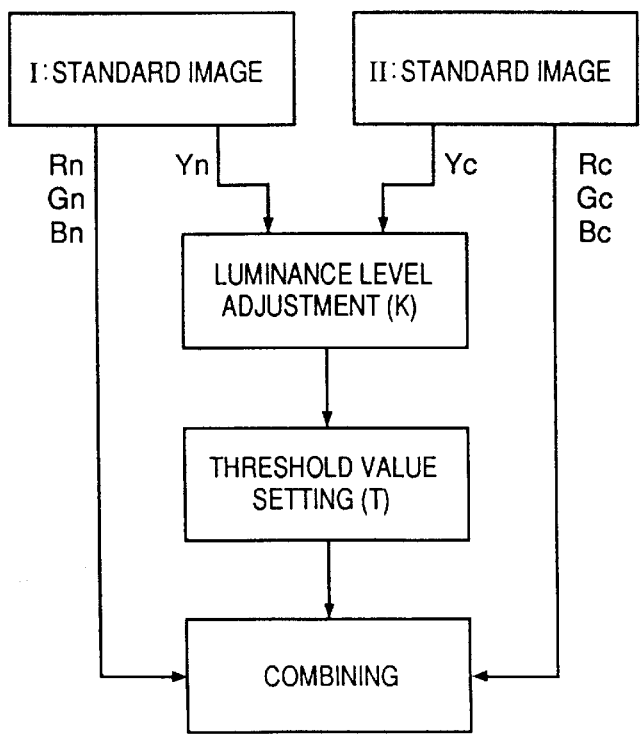

FIGS. 25A and 25B show the outline of the operation of the image combining block in FIG. 24A. The image combining procedure will be described with reference to FIGS. 25A and 25B.

For the sake of simplicity, a description will be made about a case where two image data are combined. In this example, the two images are a standard image (with proper exposure) and a non-standard image (with excessive exposure). In the standard image, a dark portion of the object is dark-corrupted, or the portion has degraded S/N ratio (noise level n). This portion is replaced with the non-standard image which has no dark-corruption and has excellent S/N ratio. In FIG. 25A, numeral I denotes a standard image signal; and II, a non-standard image signal. In combining, it is firstly necessary that the output levels (luminance levels) of the sensing device for the image signals I and II with respect to the illuminance of the object are adjusted to match. So, the standard image signal is multiplied by K, luminance level adjusting factor, to obtain a standard image signal III. This value K is obtained from calculation to be described later on the basis of the image signals I and II every image combining.

Next, a dark portion of the standard image signal III, which was separated by a threshold T, is replaced with the non-standard image signal II. Similar to for the luminance level adjusting factor K, the threshold T should be obtained from calculation of the image signals I and II or the image signals I and III at each image combining.

FIG. 25B shows the flow of the combining operation illustrated in FIG. 24A. After an A/D conversion of the image sensing device output signal, the luminance level adjusting factor K and threshold T are calculated using the standard image signal and the non-standard image signal stored in the memory. The combining may be performed using only the luminance signal and by adding color data thereafter. Otherwise, the combining may be performed using color signals (R, G and B, Y, M, G and C etc.).

Figure 26:
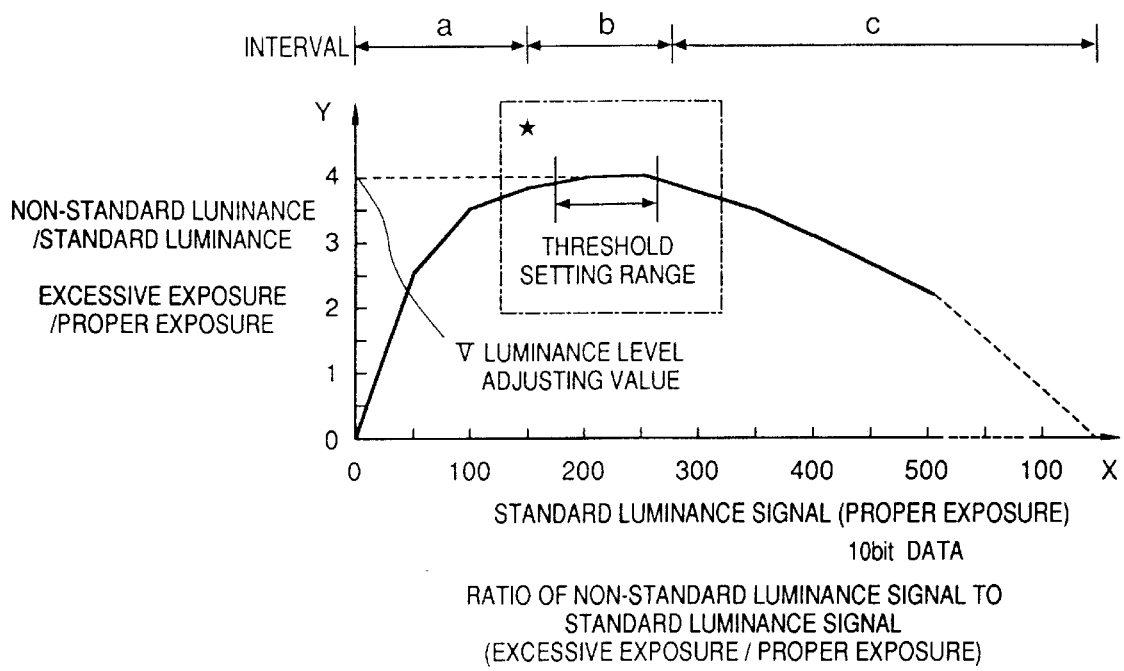
FIG. 26 is a line graph showing the ratio of a non-standard luminance signal to a standard luminance signal.

Next, the calculation for obtaining the luminance level adjusting factor and threshold will be described with reference to FIGS. 25A, 25B, 26 and 27. Note that in this example, it is assumed that the non-standard image signal II (with excessive exposure) is obtained from sensing with exposure two-step larger than that in sensing the standard image signal I First, with respect to all the pixel values of the image signals to be combined, how many times the non-standard image signal II is larger than the standard image signal I is examined, and the examined multiples are averaged. This average is the luminance level adjusting factor K. In FIG. 26, pixel values of the image signal I (FIG. 25) are represented on the horizontal (X) axis, and average values of multiples indicating how many times the image signal II is larger than the image signal I are represented on the vertical (Y) axis. As the image signal II is obtained by sensing with exposure twice larger than that for the image signal I, theoretically, the value of the image signal II is four times larger (K=4). However, actually, the value of the K is not four ("4") because of the difference between image sensing devices, the characteristic of A/D converter, the difference between the illuminance of the object by the sensing to obtain the signals, and the like. In the graph in FIG. 26, the image signal II has a significant value in interval a, however, the image signal I resides in an area of noise level in FIG. 25A. Accordingly, the Y-axis value in this interval does not correspond to the K=4 relation. Interval c corresponds to the white corrupted portion of the image signal II and does not correspond to the K=4 relation. In interval b, the K=4 relation theoretically holds, where the both image signals have no noise level value and no white corrupted portion. However, K=4 does not hold for the actual imaging devices due to the aforementioned reasons. Accordingly, the averaged value among the Y-axis values in this interval b is obtained as the luminance level adjusting factor K. Thus, a value appropriate to the actual image sensing device is obtained. In this embodiment, this value K is approximately "3.85".

In the present image combining, as the interval a of the image signal I is replaced with the corresponding interval of the image signal II, the threshold as the border for the replacement preferably resides in "threshold setting range" in the interval b. A threshold obtained from this range provides a combined image signal in which pseudo outlines are reduced.

Figure 27:
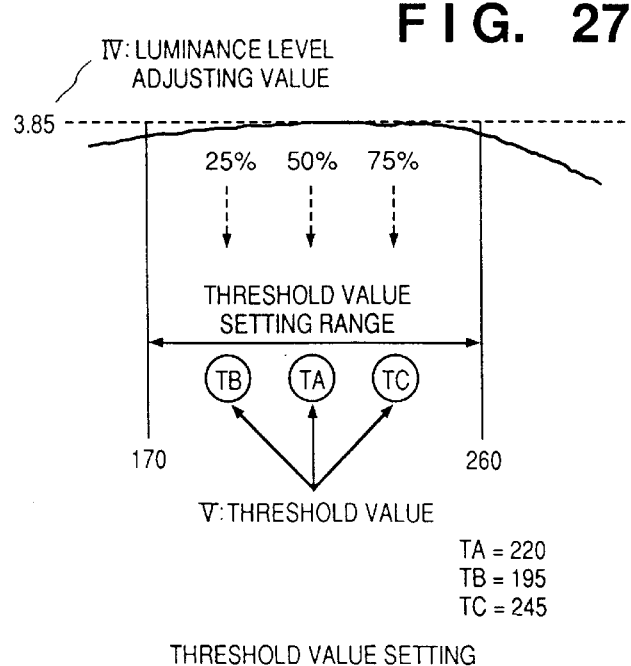
FIG. 27 is an enlarged view of a threshold setting range.

Next, how to set a threshold in the "threshold setting range" in FIG. 26 will be described with reference to FIG. 27. FIG. 27 shows an enlarged view of the "threshold setting range" in FIG. 26. For example, a threshold TA is a value at a 50% point between the minimum and maximum values within the threshold setting range; a threshold TB, at a 25% point; and a threshold TC, at a 75% point. In this embodiment, "TA=220, TB=195, and TC=245". Upon image combining, one of these values may be used, or values from the thresholds TB to TC are used as a variable threshold for separating the area to be combined.

Figure 28:
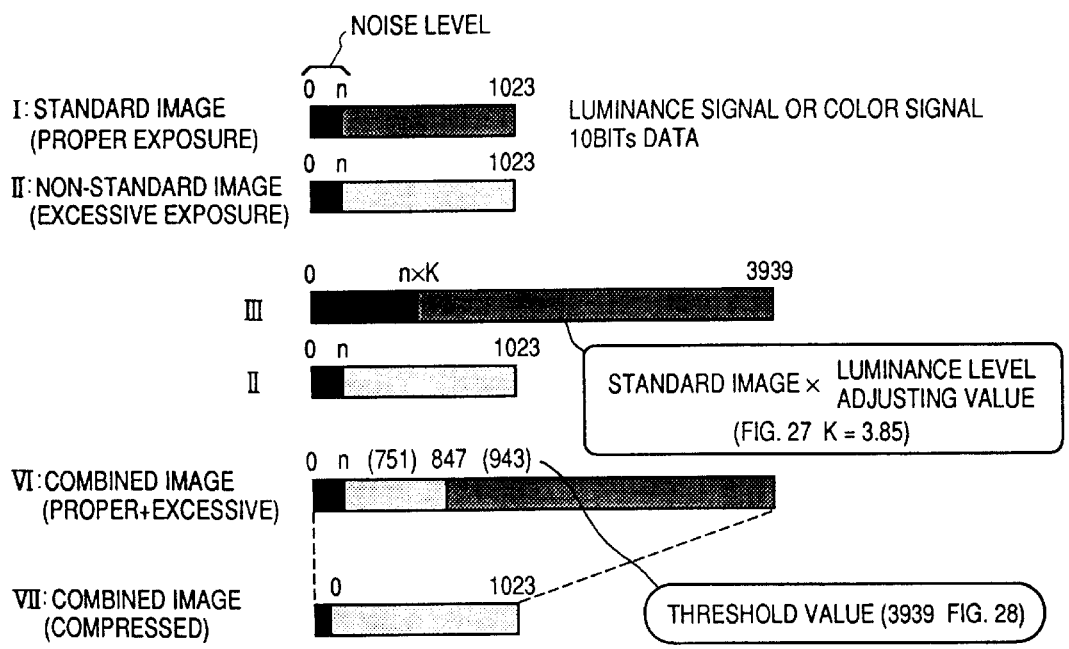
FIG. 28 is a bar graph showing an example of image combining using a luminance level adjusting factor and a threshold value.

Next, the combining the signals I and II using the luminance level adjusting factor K obtained by the method shown in FIGS. 26 and 27, and the threshold T, will be described with reference to FIG. 28. Note that the signals I and II in FIGS. 28 are both 10-bit data having values 0~1023.

Initially, the image signal I is multiplied by the luminance level adjusting factor K (=3.85) obtained in FIG. 26 so as to accord the luminance level of the signal I to that of the image signal II, thus image signal III is obtained. At this time, the noise level n is also multiplied by K. Next, a dark portion of the image signal III darker than the threshold TA (=220× 3.85=847; T should be multiplied by K, as image signal I is multiplied by K) is replaced with the image signal II into a combined image signal VI. The threshold T may be either one of TB (=195×3.85=751) and TC (=245×3.85=943), or may be any value between the thresholds TA and TB. Thus, as the noise level portion of the image signal III (from n×K to n) is replaced with the image signal II, the dynamic range is enlarged. Finally, the image signal VI is compressed to have the output width (10 bits in this example) and is outputted (image signal VII). In this combining, the luminance level adjusting factor K and the threshold T are obtained using direct signals from the sensor among image signals, however, other signal-processed luminance signals or color signals may be used for a similar processing.

As described above, the present image combining method combines a plurality of image signals obtained with different exposure amounts, every combining time when the luminance level adjusting factor K is obtained from the image signals and the threshold T is obtained by calculation. In this manner, combining using the luminance level adjusting factor and threshold obtained by calculation provides an excellent combined image with very few pseudo outlines. Further, in this embodiment, the standard image signal is image data sensed with proper exposure and the non-standard image signal is image data sensed with excessive exposure, however, combining of a standard image signal from sensing with proper exposure and non-standard image signal from sensing with insufficient exposure may be similarly made. Moreover, the number of image signals to be combined is not limited to two, but may be three or more.

Ninth Embodiment

Figure 29:
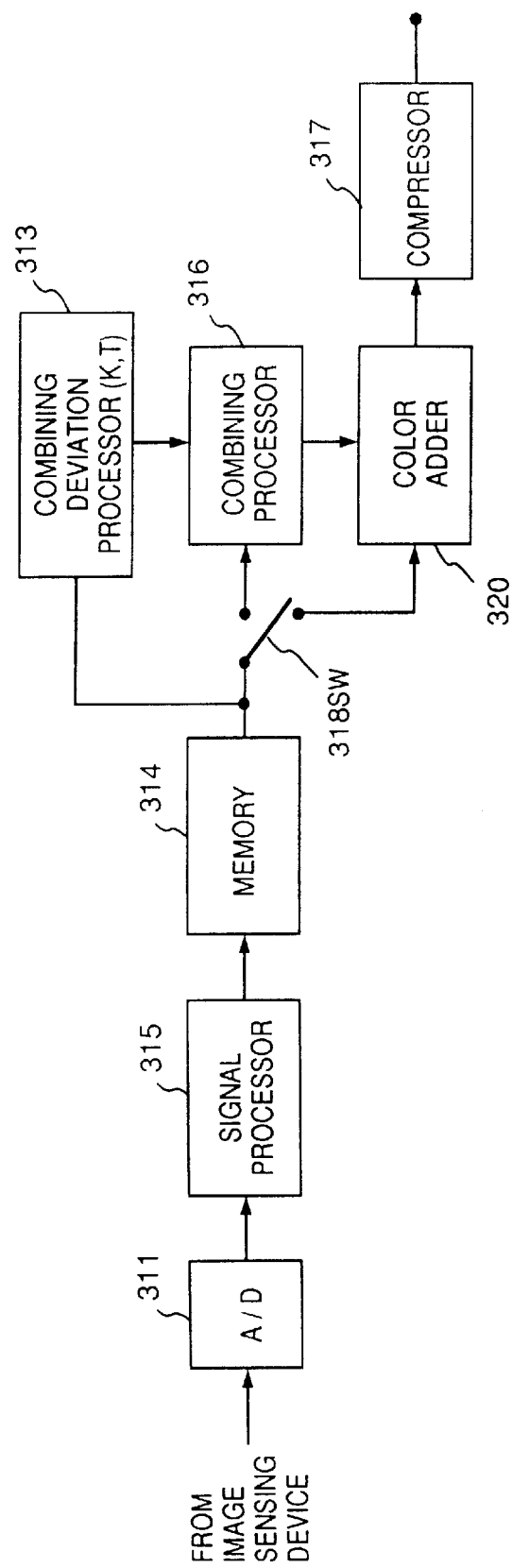
FIG. 29 is a block diagram showing the construction of an image data processing apparatus according to a ninth embodiment of the present invention.

FIG. 29 shows the ninth embodiment of the present invention. Regarding the elements for processing corresponding to the image combining unit in FIG. 24A, numeral 20 denotes a color adder for newly generating combined color signals from a combined luminance signal and standard color signals.

For the sake of simplicity, the ninth embodiment also will be described as a case where an image signal obtained by sensing with proper exposure as a standard image and an image signal obtained by sensing with excessive exposure as a non-standard image are combined. In FIG. 29, the A/D converter 311 digitizes the image signals, and the signal processor 315 generates the standard luminance signal $Y_n$, the standard color signals $R_n$, $G_n$ and $B_n$, and the non-standard luminance signal $Y_c$, the non-standard color signals $R_c$, $G_c$ and $B_c$ based on the signals from the A/D converter 311, and sequentially stores the color signals into the memory 314. If combining is not performed, the compressor 317 compresses the signals in accordance with the output characteristic of an output device, and outputs the compressed data. In dynamic range enlarging mode, similar to the eighth embodiment, the combining deviation processor 313 calculates the luminance level adjusting factor K and threshold T, with referring to the luminance signals $Y_n$ and $Y_c$ stored in the memory 314. The combining processor 316 combines the luminance signals $Y_n$ and $Y_c$ into the luminance signal $Y_g$ using these values. The color adder 20 uses the combined luminance signal $Y_g$ and the color signals $R_n$, $G_n$ and $B_n$, and $R_c$, $G_c$ and $B_c$ to generate the combined color signals $R_g$, $G_g$ and $B_g$. The compressor 317 compresses the combined color signals in accordance with the output character of the output device, and outputs the compressed signals.

The color adder 20 compares the combined luminance signal $Y_g$ from the combining processor 316 with the standard luminance signal $Y_n$ from the memory 314, and newly generates the combined color signals $R_g$, $G_g$ and $B_g$ using the standard color signals $R_n$, $G_n$ and $B_n$ from the memory 314.

FIG. 30 shows the calculation for generating the combined color signals. First, as expressed by equation (1), the combined luminance signal $Y_g$ and the standard luminance signal $Y_n$ are compared to obtain the factor K. Next, as expressed by equations (2) to (4), the standard color signals are respectively multiplied by the coefficient K, and the combined color signals $R_g$, $G_g$ and $B_g$ are obtained.

The example shown in FIG. 30 is calculation for a pixel ($R_n$=150, $G_n$=100, $B_n$=30, $Y_n$=107, $Y_g$=110). This calculation is performed for every pixel of the combined luminance signal, and thus the combined color signals R, G and B are obtained.

As described above, the combined color signals are generated by multiplying the standard color signals by K. This is because when the dynamic range of the standard luminance signal is enlarged, the combined luminance signal value becomes a multiple of the standard luminance signals by K. If the standard color signals are used as the combined color signals, color saturation is degraded then the overall color is thinned, thus the color balance is degraded. Accordingly, to adjust the color saturation, the standard color signals are multiplied by K and the dynamic range is enlarged, so that a combined color image with enlarged dynamic range can be obtained without degradation of color balance.

Tenth Embodiment

Figure 31:
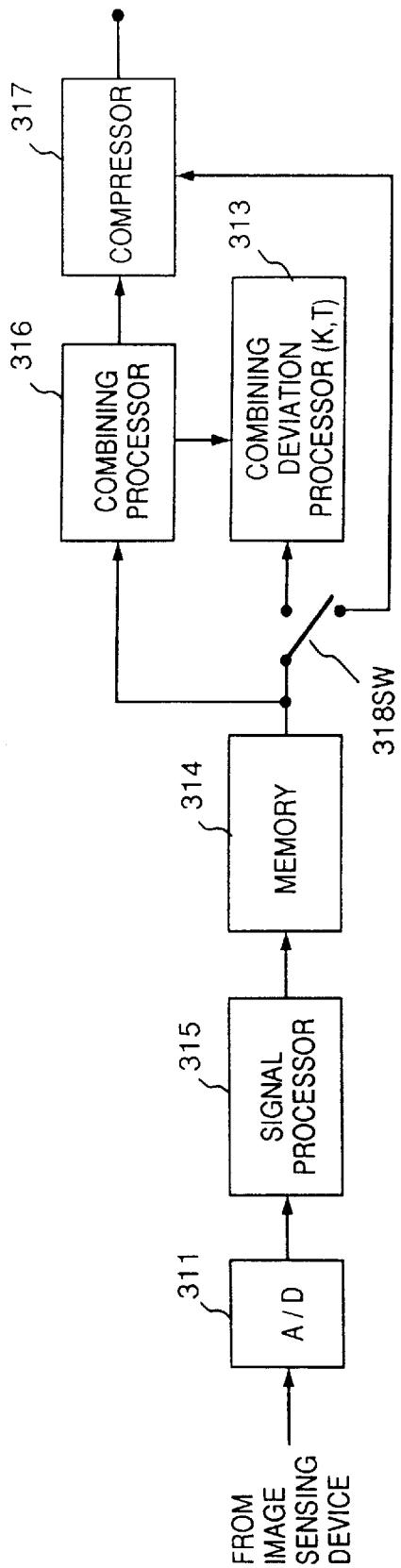
FIG. 31 is a block diagram showing the construction of an image data processing apparatus according to a tenth embodiment of the present invention.

FIG. 31 shows the construction of the tenth embodiment of the present invention. The elements corresponding to the image combining unit will be described.

Also for the sake of simplicity, the tenth embodiment will be described as a case where an image signal obtained by sensing with proper exposure as a standard image and an image signal obtained by sensing with excessive exposure as a non-standard image are combined. In FIG. 31, the A/D converter 311 digitizes the image signals, and the signal processor 315 generates the standard color signals $R_n$, $G_n$ and $B_n$, and the non-standard color signals $R_c$, $G_c$ and $B_c$ based on the digital signals, and sequentially stores the color signals into the memory 314. If image combining is not to be performed, the compressor 317 compresses the color signals in accordance with an output device and outputs the compressed signals. In a dynamic range enlarging mode, the combining deviation processor 313 calculates the luminance level adjusting factor K and threshold T for the respective colors, and the combining processor 316 performs combining for each color. Thereafter, the compressor compresses the signals corresponding to the output device and outputs the compressed signals.

Accordingly, image combining by the above construction produces an image signal which has enlarged dynamic range of color and has very few pseudo outlines. In the present embodiment, an image signal obtained by sensing with proper exposure as standard image signal and an image signal obtained by sensing with excessive exposure as non-standard image signal are combined. However, the non-standard image signal may be obtained by sensing with insufficient exposure. Further, the number of image signals to be combined is not limited to two, but as far as it is plural, it may be three or more. Moreover, R, G and B color component signals are used as the color signals, however, complementary color signals such as Y, M and C signals may be used for combining.

Advantages of Eighth to Tenth Embodiments

As described above, according to the eighth to tenth embodiment, the image processing apparatus, which combines a plurality of image data from sensing with different exposure amounts to obtain an image with a wide dynamic range, upon combining, adjusts the luminance levels of the plurality of image data, and on each image combining, calculates a luminance level adjusting factor using the plurality of image signals. Further, the apparatus separates a dark or bright portion of the standard image using a plurality of thresholds obtained at each image combining and replaces the portion with a corresponding portion of the non-standard image, thus greatly reduces pseudo outlines caused which appeared in the conventional combining, by using a predetermined luminance level adjusting factor or threshold.

Improvement of S/N Ratio

Recently, image sensing apparatuses such as a digital video movie camera and a digital still video camera which treat image signals from sensing an object as digital signals have been put into practical use. In such image sensing apparatuses, an output signal from a solid-state image sensing device is gain-controlled after sample holding, then converted by an A/D converter into a digital signal, and stored into a memory. The digitized image signal is converted into a luminance signal and a color difference signal in the NTSC/PAL specifications, otherwise, processed as R, G and B signals then converted by a D/A converter into analog signals and outputted to a monitor, or inputted into a computer as digital information.

Notes that tone levels of the digital image sensing apparatus as above is determined depending on the A/D converter, which has 8 to 10-bit levels. However, the levels of the current A/D converter are insufficient for a color tone in a low-luminance portion of the object. For this reason, the combined image has coarse image quality and it provides unpleasant feeling to a viewer.

Further, in the conventional image sensing apparatus, SIN ratio of a final image is determined in accordance with a noise which is generated in the solid-state image sensing device and a random noise which occurs to an analog circuit system from image signal input to A/D conversion. However, the noises are outstanding in low luminance portion, therefore, an excellent image of high S/N ratio cannot be obtained.

In the conventional digital image sensing apparatus having the above construction, where the number of tone levels is determined in accordance with the A/D converter, and the S/N ratio of a final image is determined in accordance with a noise which occurs to the image sensing device and a random noise which occurs to the analog circuit system, the image quality at a low luminance portion is degraded.

To solve this problem, image sensing may be performed with increased exposure, then the image signal may be digitized and gain-controlled by calculation. However, in this case, as the dynamic range of the conventional image sensing device is small, a high luminance portion is saturated and the information of the high luminance portion is lost.

The eleventh embodiment to be described below is made in view of the above problems, to provide an image sensing apparatus and its image processing method which obtain a high-quality digital image having an excellent S/N ratio, a high tone level and a wide dynamic range.

Eleventh Embodiment

Figure 32:
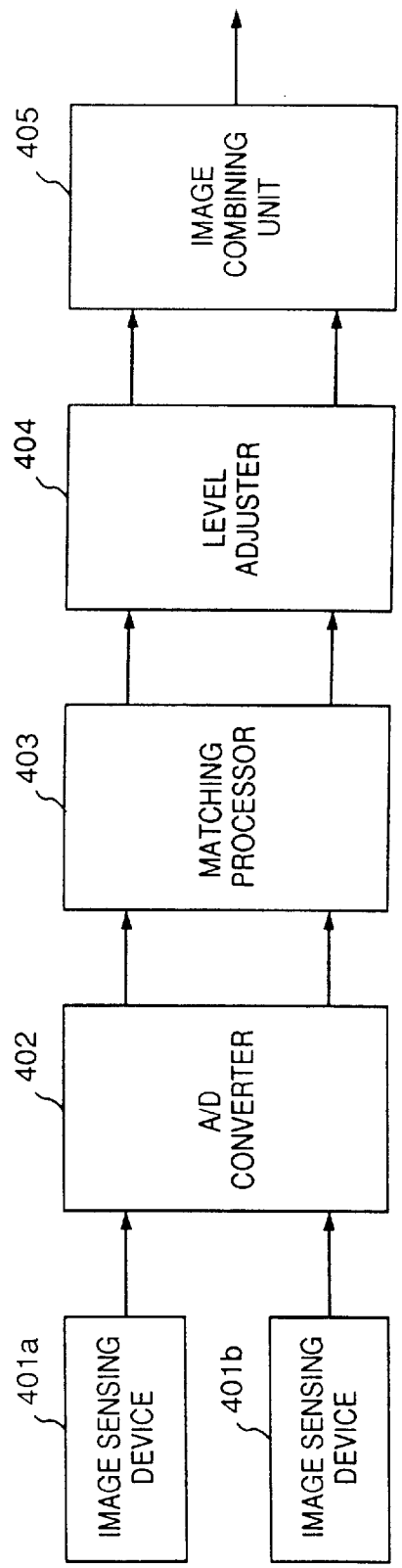
FIG. 32 is a block diagram showing the construction of an eleventh embodiment of the present invention.

FIG. 32 shows the construction of the image sensing apparatus according to the eleventh embodiment of the present invention.

In FIG. 32, numerals 401a and 401b denote solid-state image sensing devices for photoelectric-converting lights from sensing an object with different exposure amounts; 402 denotes A/D converter for digitizing respective image data from the image sensing devices 401a and 401b; and 403 denotes, a matching processor for matching image positions of the digitized image data. The matching processor 403 corrects the deviation between the respective digital images and matches the positions.

Numeral 404 denotes a level adjuster for adjusting the levels of digitized image data; and 405, an image combining unit for combining the level-adjusted image data into one digital image data. A predetermined image processing is performed on the image signal outputted from the image combining unit 405 by a processing circuit (not shown) to obtain R, G B color signals, or Y and C luminance signals and a color difference signal. Furthermore, the processed image data is stored, for instance in the memories (not shown).

Next, the operation of the image sensing apparatus will be described with reference to the flowchart in FIG. 33.

First, the image sensing device 401a and 401 b input image data I and II obtained by sensing a scene with different exposure amounts on a plurality of conditions into memories (not shown) simultaneously or substantially simultaneously. Note that in a case where a camera which has an optical system for forming images of the same object at a plurality of solid-state image sensing devices as shown in FIG. 32 using a prism, similar to a multi-plate camera, the image data are stored into the memories simultaneously. In this case, exposure amounts of the respective solid-state image sensing devices may be controlled by changing storing time of the respective solid-state image sensing devices, or inserting an ND filter in front of the solid-state image sensing device. In a case where a single-plate camera is used for continuous image sensing to obtain a plurality of images with different exposure conditions (diaphragm opening amounts to differ shutter-release speed), the image data are stored into the memories substantially simultaneously.

The plurality of image data are read out as the outputs of the solid-state image sensing devices 401a and 401b, sample-held, then gain-controlled, and A/D-converted to be stored into the respective memories 406*a* and 406*b*.

The image data I and II are data stored into the memories after the A/D conversion. In this embodiment, the image data I is from sensing with standard exposure, and the image data II is from sensing with exposure three times as much as the standard exposure. These data are digitized by a 10-bit A/D converter, accordingly, both are approximately 1024 level data.

Note that although all the ten bits are used for the image data but some offset is included actually, in this embodiment, all the ten bits are treated as image information.

Figure 33:
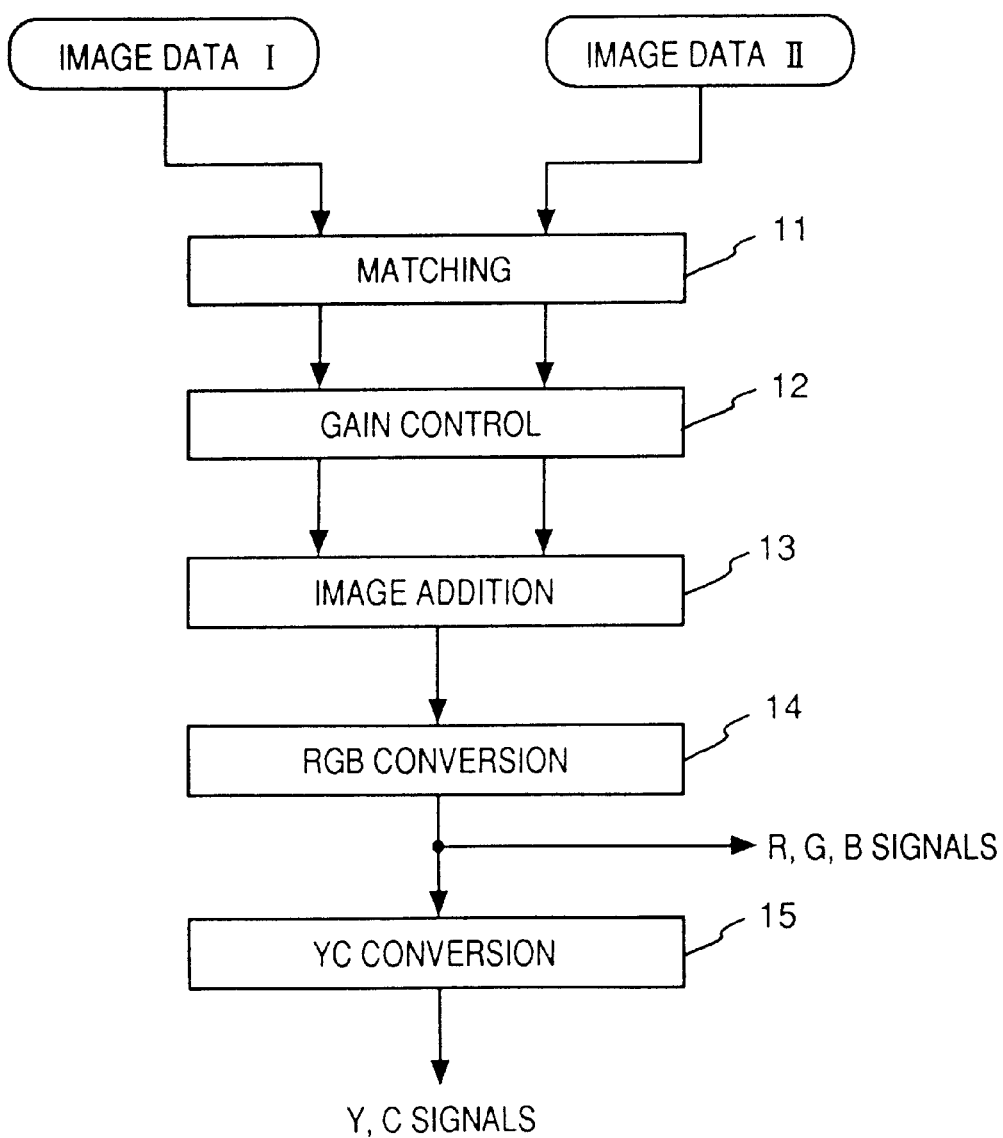
FIG. 33 is a flowchart showing the operation of the eleventh embodiment.

Referring to FIG. 33, in step S11, image matching processing is performed on the image data I and II. This is not required when a multi-plate optical system is used as an image pick-up unit. If a single-plate system is used, the image data I and II are to be sensed at slightly different time, as a result, the positions of these data are slightly different. For this reason, the image data I and II are compared and the coordinates are corrected to match the position of the image data I with that of the image data II. This processing may be "blur prevention" processing currently used in video movie cameras on the market.

Next, after the positional relation between the two images is corrected, gain control processing is performed so that the image level of the image data II and corresponds with that of the image data I in step S12. At this time, the image data II sensed with exposure three times as much as that of the image data I may be multiplied by ⅓. Actually, the exposure of camera differs depending upon a system, i.e., mechanical difference of diaphragm or shutter, difference of an optical system and the like. Accordingly, high-precision gain control by the comparison between actual image data is required.

In the above image data I and II, any saturated portion must be deleted. In this example, the image data II at level "1000" or below that level (the value is lower than the saturation level "11024" to some degree so as to completely eliminate the saturation level data) and the image data I at level "333" or below are subjected to the comparison.

Further, low-luminance level data which is greatly influenced by noise component must be deleted. In this embodiment, the lower limit of the image data I is "100" and that of the image data II is "300". Normally, white 100% level is set to be about ⅓ to ¼ of saturation level, therefore, the level to be referred for gain control is white 30 to 40%.

Then, average values are obtained from the defined areas of the respective images. Assuming that the average value of the image data I is A, that of the image data II is B, and pixel data value of the image data II is C, calculation A÷B×C adjusts the level of the image data II to that of the image data I.

Note that a gain control of the image I with respect to II which is more precise than the above gain can be obtained by extracting smooth areas having small luminance level deviation within the respective image data and comparing the average values between the images from only the extracted areas.

Another method for obtaining a gain control is extracting areas closer to white and comparing the average values between the images from only the extracted areas. This method further raises precision by virtue of well-balanced level of the respective color pixels (Y, MG, G and Cy in case of complementary color solid-state image sensing device, or if in case of pure color image sensing device, R, G and B).

Further, a gain control which can reduces a required processing time, by which precision is more or less lowered, is obtained by pre-determining comparison areas, e.g., the central portion or the central upper portion, and comparing the average values within the predetermined areas so far as the portions are not saturated can greatly reduces processing time.

As the image matching and gain control have been completed, image addition processing where the image data I and the image data II are added is performed in step S13. The data addition uses the higher luminance data of the image data I and the lower luminance data of the image data II.

Figure 34A:
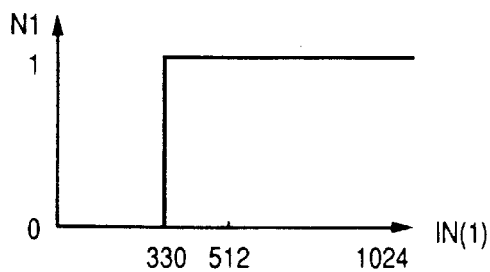
FIGS. 34A and 34B are line graphs showing an example of image addition processing of the eleventh embodiment.
Figure 34B:
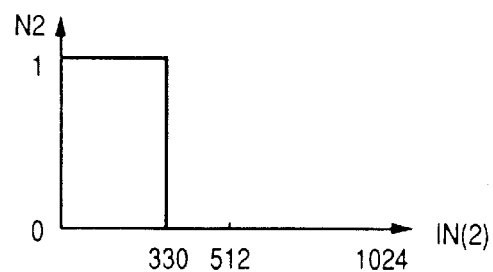

FIGS. 34A and 34B show the above addition processing.

As the amount of the image data II is reduced to ⅓ of the initial amount by the gain control, the maximum level of the image data II is about "341". The horizontal axis IN(1) in FIG. 34A represents the respective pixel data of the image data I; the horizontal axis IN(2) in FIG. 34B, the respective pixel data of the image data II. The vertical axis N1 represents coefficients for the image data I; the vertical axis N2, coefficients for the image data II.

In accordance with the graphs 34A and 34B, one image is combined by:

$$IN(1) \times N1 + IN(2) \times N2$$

In this case, within the image data II, the image data II is used as the data lower than level "330" lower than the saturation level "341", but the image data I is used as the data at level "330" or greater. This reduces the S/H of a portion at a level of ⅓ of the saturation level or lower, and increases the number of levels to three times larger, thus obtains a high-quality and high-precision image.

However, there is a possibility of occurrence of pseudo color band by using data greater or less than value "330" as false color from the disturbance of the data information around the value "330" due to error in gain control.

Accordingly, as shown in FIGS. 35A, 35B, 36A and 36B, the width of intervals where both the image data I and II change respectively may be increased so that the information of the image data I and II are mixed and the mixture ratio may be gradually changed.

Figure 35A:
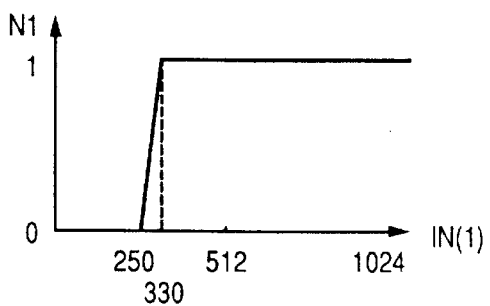
FIGS. 35A and 35B are line graphs showing another example of the image addition processing of the eleventh embodiment.
Figure 35B:
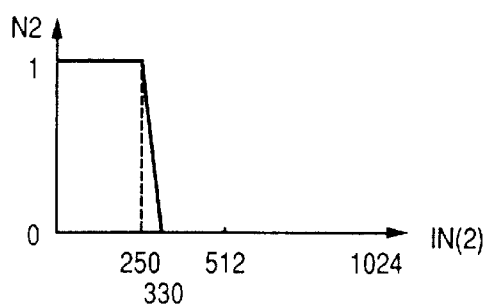
Figure 36A:
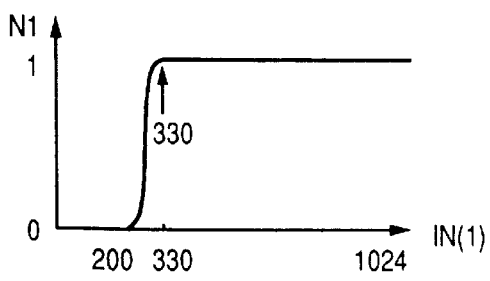
FIGS. 36A and 36B are line graphs showing another example of the image addition processing.
Figure 36B:
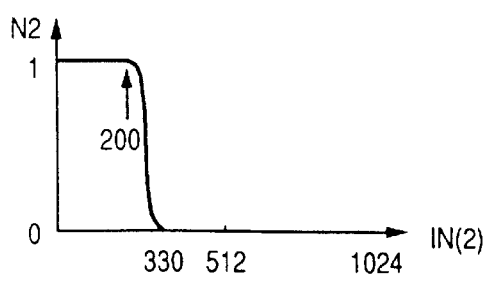

In FIGS. 35A and 35B, the ratio of the image data I information to the image data II information changes linearly, and in FIGS. 36A and 36B, the ratio change changes in a cosine curve. Note that in any one case, N1+N2 is always "1". This reduces the influence at the transitional portion between the image data I and II due to error in gain control, and prevents occurrence of a false image.

Next, the image data combined as described above is converted into R, G and B signals and outputted in step S14. Further, the signals are converted in the following step into a luminance signal Y and a color difference signal C in step S15. Then, these signals are outputted to a monitor television, or a computer as image information.

Note that in this example, the level for changing the images I and II is at about ¼ to ⅓ of the saturation level, however, it may be the transitional data level of a gamma curve to be described later at changing from standard luminance to higher luminance. This further reduces the influence due to error in gain control.

The image processing as described above can obtain a high-quality digital image having improved S/N ratio, a high tonality and wide dynamic range.

Modification to Eleventh Embodiment

Figure 37:
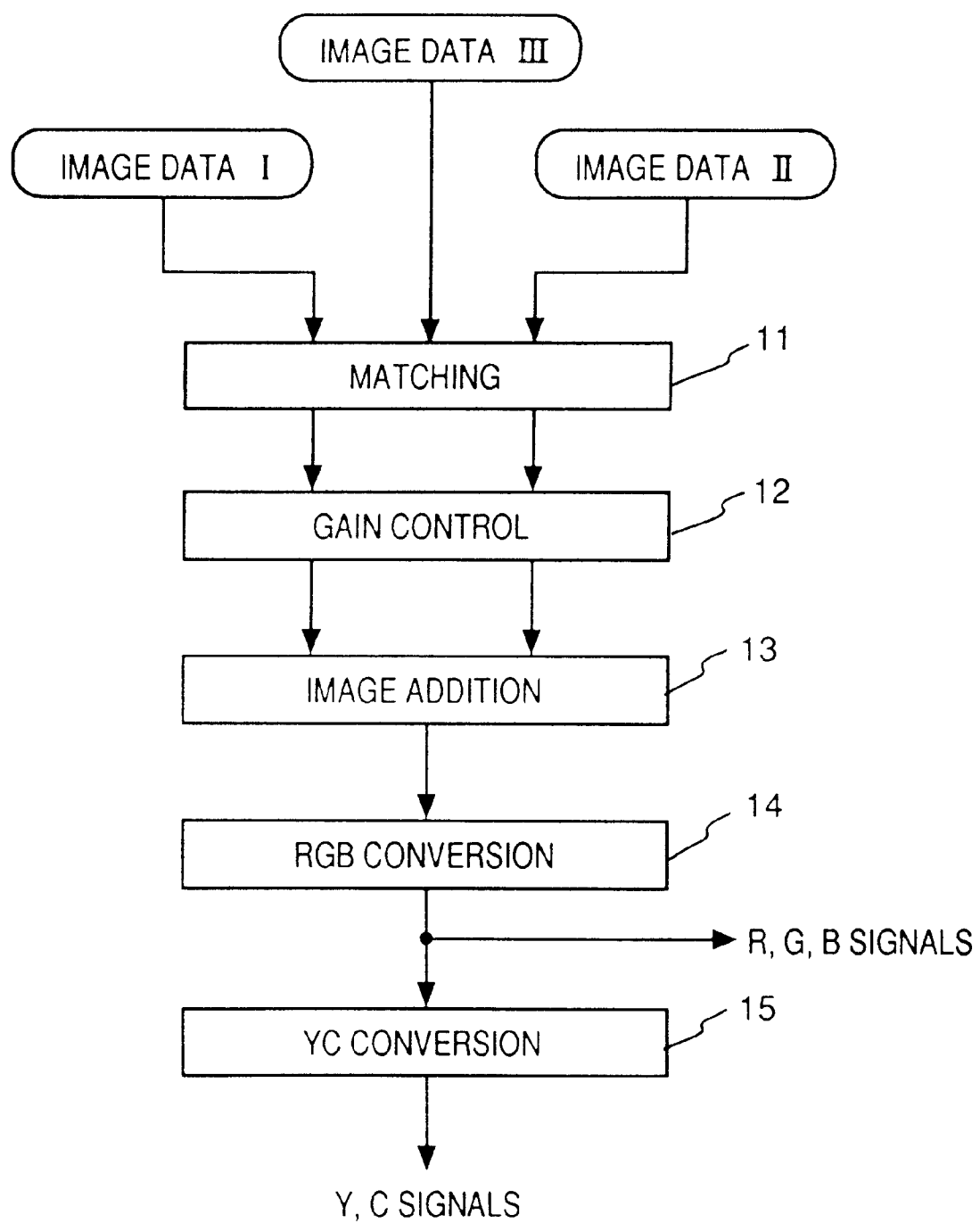
FIG. 37 is a flowchart showing the operation of modification to the eleventh embodiment.

FIG. 37 is a flowchart showing the operation of a modification to the eleventh embodiment.

The modification employs the image data I, II the same as those in the eleventh embodiment, and image data III obtained from sensing with exposure ⅓ of the standard exposure.

In step S11, the positions of the three image data I, II and III are matched, and in step S12, gain control is performed on the three image data. At this time, the image data II is reduced to approximately ⅓ of the initial data amount, and the image data III is increased to the three times as much as the initial data amount. As a result, the maximum value of the image data III becomes "3072".

Next, in step S13, the image data I and image data II are combined in the same manner as that in the eleventh embodiment, and the image data III and the image I are combined in the same manner. In this case, the level of changing over the image data I and the image data III is within a range of level "700" to level "1000".

The above image processing enlarges the dynamic range of output digital image more than the final image outputted in the eleventh embodiment. Accordingly, even an object image at an ultra-high luminance portion can be clearly sensed, and the noise of an image at a lower luminance portion is reduced, thus, a vivid image having a large amount of information can be obtained.

Note that the combining may be made only using the image data I and the image data III as another modification to the eleventh embodiment. In this case, the processing method is the same as that in the foregoing embodiments. In addition, the combining may be made only using the image data II and the image data III.

In the eleventh embodiment, the exposure of the image data II and III are respectively three times and ⅓ of the standard exposure. However, e.g., if the exposure of these data are respectively four times and the ¼ of the standard exposure, a higher-quality image can be obtained.

Advantages of Eleventh Embodiment

As described above, according to the eleventh embodiment, combining a plurality of image data obtained from sensing with changing exposure amount provides a high-quality digital image having a good S/N ratio, high tone level and wide dynamic range.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:

conversion means for digitally converting a plurality of images obtained by sensing an object with different exposure amounts;

level adjusting means for calculating average luminance levels respectively for said plurality of images using the digitized image data except for digitized image data which satisfy conditions predetermined for each of said plurality of images and adjusting luminance levels of said image data of said plurality of images on the basis of the average luminance levels; and image combining means for combining the level adjusted image data.

2. The apparatus according to claim 1, wherein said level adjusting means performs level adjustment by extracting areas from the plurality of images which have commonly small luminance change and by comparing average luminance levels of the extracted areas.

3. The apparatus according to claim 1, wherein said level adjusting means performs level adjustment by extracting areas close to white and comparing average luminance levels of the extracted areas.

4. The apparatus according to claim 1, wherein said level adjusting means performs level adjustment by extracting arbitrary areas of the image data and comparing average luminance levels of the extracted areas other than saturated portions.

5. The apparatus according to claim 1, wherein said image combining means generates a combined image by combining any combinations of:

lower luminance image data obtained by sensing with an exposure larger than standard exposure;

higher luminance image data obtained by sensing with the standard exposure; and ultra higher luminance image data obtained by sensing with a exposure less than the standard exposure.

6. The apparatus according to claim 5, wherein said image combining means generates image data with a fixed value, the image data being put at pixels where the images to be combined overlap.

7. The apparatus according to claim 5, wherein said image combining means generates a plurality of image data which have variable mixture ratios of a lower luminance image data and a higher luminance image data, the plurality of image data being put at pixels where the images to be combined overlap.

8. The apparatus according to claim 7, wherein the mixture ratio changes linearly.

9. The apparatus according to claim 7, wherein the mixture ratio changes substantially in accordance with a cosine curve.

10. An image processing method comprising the steps of:

converting a plurality of image data which have been obtained by simultaneously or continuously sensing an object with different exposures into digital data;

calculating average luminance levels respectively for said plurality of images using the digitized image data except for digitized image data which satisfy conditions predetermined for each of said plurality of images;

adjusting luminance levels of said image data of said plurality of images on the basis of the average luminance levels; and combining the level adjusted image data.

11. The method according to claim 10, wherein said luminance level adjusting step performs level adjustment by extracting areas from the plurality of images which have commonly small luminance change and by comparing average luminance levels of the extracted areas.

12. The method according to claim 10, wherein said luminance level adjusting step performs level adjustment by extracting areas close to white and comparing average luminance levels of the extracted areas.

13. The method according to claim 10, wherein said luminance level adjusting step performs level adjustment by extracting arbitrary areas of the image data and comparing average luminance levels of the extracted areas other than saturated portions.

14. The method according to claim 10, wherein said image combining step generates a combined image by combining any combinations of:

lower luminance image data obtained by sensing with an exposure larger than standard exposure;

higher luminance image data obtained by sensing with the standard exposure; and ultra higher luminance image data obtained by sensing with an exposure less than the standard exposure.

15. The method according to claim 14, wherein said image combining step generates image data with a fixed value, the image data being put at pixels where the images to be combined overlap.

16. The method according to claim 14, wherein said image combining step generates a plurality of image data which have variable mixture ratios of a lower luminance image data and higher luminance image data, the plurality of image data being put at pixels where the images to be combined overlap.

17. The method according to claim 16, wherein the mixture ratio changes linearly.

18. The method according to claim 16, wherein the mixture ratio changes substantially in accordance with a cosine curve.

* * * * *

UNITED STATES PATENT AND TRADEMARK OFFICE
CERTIFICATE OF CORRECTION

PATENT NO. : 6,204,881 B1
DATED : March 20, 2001
INVENTOR(S) : Eiichiro Ikeda et al.

It is certified that error appears in the above-identified patent and that said Letters Patent is hereby corrected as shown below:

Title page,
In the Notice [*], please insert the following:
-- This patent issued on a continued prosecution application filed under 37 CFR 1.53(d), and is subject to the twenty year patent term provisions of 35 U.S.C. 154(a)(2) --;

Related U.S. Application Data,
Item [62], please change "08/328,539" to -- 08/329,528 --;

Foreign Application Priority Data,
Item [30], please change the filing date of the first Priority Document 5-281008 from "Oct. 10, 1993 (JP)" to -- Nov. 10, 1993 (JP) --;

Foreign Application Priority Data,
Item [30], please further insert on a new line after "Oct. 29, 1993 (JP) . . . 5-271942" the following: -- Oct. 29, 1993 (JP) . . . 5-271943 --;

References Cited,
Item [56], please insert the following sub-heading --Foreign Patent Documents -- and thereunder insert -- JP A60-52171 3/1985 Japan -- and -- JP A63-306777 12/1988 Japan --.

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*